US00RE48062E

(19) United States
(12) Reissued Patent
Noyce Merino

(10) Patent Number: US RE48,062 E
(45) Date of Reissued Patent: Jun. 23, 2020

(54) FIREARM WITH GAS-ASSIST RECOIL OPERATION SYSTEM

(71) Applicant: Michael Noyce Merino, Melrose, MT (US)

(72) Inventor: Michael Noyce Merino, Melrose, MT (US)

(21) Appl. No.: 16/029,613

(22) Filed: Jul. 8, 2018

Related U.S. Patent Documents

Reissue of:

(64) Patent No.: 9,921,022
Issued: Mar. 20, 2018
Appl. No.: 15/621,958
Filed: Jun. 13, 2017

(51) Int. Cl.

| | |
|---|---|
| ***F41A 21/00*** | (2006.01) |
| ***F41A 25/02*** | (2006.01) |
| ***F41A 25/26*** | (2006.01) |
| ***F41A 21/36*** | (2006.01) |
| ***F41A 5/02*** | (2006.01) |
| ***F41A 21/28*** | (2006.01) |
| ***F41A 25/16*** | (2006.01) |

(52) U.S. Cl.
CPC ..... *F41A 21/36* (2013.01); *F41A 5/02* (2013.01); *F41A 21/28* (2013.01); *F41A 25/02* (2013.01); *F41A 25/16* (2013.01); *F41A 25/26* (2013.01)

(58) Field of Classification Search
CPC ..... F41A 21/36; F41A 25/02; F41A 25/16; F41A 5/02; F41A 21/28; F41A 25/26
See application file for complete search history.

(56) References Cited

U.S. PATENT DOCUMENTS

| | | | | |
|---|---|---|---|---|
| 3,805,668 | A * | 4/1974 | Zellweger | F41A 25/02 89/177 |
| 3,990,347 | A * | 11/1976 | Junker | F41A 3/26 89/185 |
| 5,353,681 | A * | 10/1994 | Sugg | F41A 25/16 89/177 |
| 7,610,844 | B2 | 11/2009 | Kuczynko | |
| 7,934,447 | B2 | 5/2011 | Kuczynko | |
| 8,607,688 | B2 | 12/2013 | Cassels | |
| 8,746,126 | B2 | 6/2014 | Zheng | |
| 8,887,616 | B2 | 11/2014 | Kenny | |
| 8,943,948 | B2 | 2/2015 | Kuczynko | |

(Continued)

FOREIGN PATENT DOCUMENTS

| | | | | |
|---|---|---|---|---|
| CH | 215689 | * | 7/1941 | F41A 3/54 |
| DE | 19739451 | * | 3/1999 | F41A 5/02 |

(Continued)

*Primary Examiner* — Jeffrey R Jastrzab
(74) *Attorney, Agent, or Firm* — Antoinette M. Tease

(57) ABSTRACT

A firearm comprising a barrel assembly, forward receiver, and receiver brake. The barrel assembly comprises a barrel, compression spring, gas tube, and front and rear bushings. The gas tube is situated around the barrel between the front and rear bushings and is not attached to the barrel. The compression spring is situated around the barrel between the front and rear bushings and inside of the gas tube. The front and rear bushings are fixedly attached to the forward receiver. The barrel comprises a gas port that is covered by a gas regulator and is in fluid communication with a gas chamber situated between the front bushing and the gas regulator, which is fixedly attached to the barrel. The receiver brake is fixedly attached to the forward receiver on its distal end.

32 Claims, 32 Drawing Sheets

(56) References Cited

U.S. PATENT DOCUMENTS

| | | | | |
|---|---|---|---|---|
| 8,950,313 | B2 | 2/2015 | Kenny | |
| 9,134,082 | B2 | 9/2015 | Brown | |
| 9,228,789 | B1 * | 1/2016 | Oglesby | F41A 21/36 |
| 9,328,981 | B2 * | 5/2016 | Kenney | F41A 5/26 |
| 2006/0065112 | A1 * | 3/2006 | Kuczynko | F41A 5/28 89/193 |
| 2010/0095834 | A1 | 4/2010 | Kuczynko | |
| 2011/0265640 | A1 | 11/2011 | Kuczynko | |
| 2013/0055883 | A1 * | 3/2013 | Cassels | F41A 5/28 89/193 |
| 2013/0291713 | A1 * | 11/2013 | Zheng | F41A 5/20 89/191.02 |
| 2014/0190344 | A1 | 7/2014 | Kenney | |
| 2014/0196599 | A1 | 7/2014 | Kenney | |
| 2014/0224113 | A1 * | 8/2014 | Brown | F41A 5/18 89/193 |
| 2015/0308764 | A1 | 10/2015 | Kenney | |
| 2016/0178299 | A1 * | 6/2016 | Cassels | F41A 5/28 89/193 |
| 2017/0299316 | A1 * | 10/2017 | Vossler | F41A 21/34 |
| 2017/0314883 | A1 * | 11/2017 | Whitfield, Jr. | F41A 5/26 |

FOREIGN PATENT DOCUMENTS

| | | | | |
|---|---|---|---|---|
| FR | 1132801 | * | 3/1957 | B64D 7/02 |
| GB | 465805 | * | 5/1937 | F41A 3/10 |
| GB | 572704 | * | 10/1945 | F41A 3/78 |
| WO | 97149828 | * | 4/1997 | F41A 5/02 |

* cited by examiner

FIREARM WITH GAS-ASSIST RECOIL OPERATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention relates generally to the field of firearms, and more particularly, to a gas-assist recoil operating system that reduces recoil.

2. Description of the Related Art

Minimizing firearm recoil is a problem that many companies and individuals have attempted to address for more than a century and to which countless hours and investment funds have been devoted. Firearm recoil, or the backward movement of a gun when it is discharged, adversely affects the accuracy of the shooter and may cause personal injury. Recoil also limits the power of the caliber being fired and ultimately lowers the performance of the round being used. The degree of recoil is typically determined by the mass of the firearm and the mass and speed of the projectile.

In military usage, recoil causes muzzle climb during automatic or burst firing as cumulative recoil acts on the firearm and the shooter. To compensate, military firearms are designed with excess weight to counteract these effects. In non-military situations, hunting rifles are made heavier in an effort to reduce recoil, and higher-caliber ammunition is not used in order to avoid recoil. Several existing recoil-reducing systems add weight, complexity and/or cost, all of which lower the appeal to the consumer.

Firearm recoil operation mechanisms use the energy of the recoil to cycle the action. Both long and short recoil-operated firearms first appeared in the late $19^{th}$ century. In a typical long recoil-operated firearm, the bolt and barrel are locked together during recoil. In a typical short recoil-operated firearm, the bolt and barrel are locked together during recoil for a certain distance, and then the bolt and barrel are decoupled, the barrel remains stationary, and the bolt continues to recoil.

Gas-operated actions were also invented in the late 1800s. John Moses Browning invented a gas-operated action (used primarily for automatic and semi-automatic rifles) in 1889. In a firearm with a gas-operated action, gases released from the ammunition are bled into the barrel, and the energy from this gas is used to unlock the action, eject the spent cartridge, load the next cartridge, and re-lock the action. In fact, most of the self-loading rifles designed during and after World War II have been gas-operated. Variations exist in terms of how the gas is tapped and how the gas energy is transferred to the bolt carrier.

Until now, recoil operating systems and gas operating systems were considered mutually exclusive or at least independent of one another. Both the recoil and the gas operating systems were designed to allow autoloading, but both systems reduce recoil to some degree. Opinions differ as to which system provides greater accuracy; however, the consensus seems to be that gas-operated guns are better at reducing recoil, but recoil-operated guns require less frequent cleaning and avoid issues associated with fouling. Set forth below are some examples of inventions designed to reduce firearm recoil.

U.S. Pat. No. 3,990,347 (Junker, 1976) discloses a firearm with a displaceable piston that is mounted at the discharge end of the barrel and configured to be acted upon and extended by combustion gases expelled from the barrel. The forward movement of the piston is transmitted to the housing so as to counteract recoil. A bolt-follower is coupled to the displaceable piston so that the forward movement of the piston caused by detonation of the cartridge shifts the bolt-follower to an unlocked position, and actuating linkage transmits the movement of the bolt during a detonation stroke to a cartridge feed control mechanism to effectuate automatic loading.

U.S. Pat. No. 7,610,844 (Kuczynko et al, 2009), U.S. Pat. No. 7,934,447 (Kuczynko et al., 2011), and U.S. Pat. No. 8,943,948 (Kuczynko et al., 2015) all describe an automatic or semi-automatic firearm with an indirect gas operating system. A gas block with a cylinder is fitted to the barrel assembly, and a piston is fitted to the cylinder. Gas discharged from a fired cartridge displaces the piston and causes the striking rod to strike the striking surface, thereby displacing the bolt assembly.

U.S. Pat. No. 8,607,688 (Cassels, 2013) and U.S. Patent Application Pub. No. 20160178299 (Cassels) both provide an adjustable gas block that is designed to interface with an autoloading gas-operated firearm. The gas block has a spring-loaded adjustment knob that controls the flow of gas into the operating system so as to avoid exhausting excess gas into the atmosphere. The adjustable gas regulator may be used with a piston operating system or a direct gas impingement operating system (gas tube).

U.S. Pat. No. 8,746,126 (Zheng, 2014) discloses an annular piston system for a firearm, the system comprising a barrel, gas block assembly, piston and spring. The gas block assembly is disposed annularly around the barrel and is adjustable to control the amount of gas flowing out of the barrel and through the gas port hold. The piston is also disposed annularly around the barrel and moves longitudinally along the barrel as gas flows out of the barrel. The spring is disposed annularly around a section of the barrel and coupled to the piston. The spring limits the distance by which the piston can move longitudinally.

U.S. Pat. No. 8,887,616 (Kenney, 2014) describes an auto-regulating gas system in which the gas flow from the firing of a projectile is restricted so as to automatically regulate operating speed. A gas block attached to the barrel redirects a volume of propellant gases to cycle the weapon. A spring-loaded plunger assembly within the gas block includes a regulator plunger with a reduced flow orifice, and the position of the plunger within the gas block automatically controls the amount of gas that is allowed to enter the system.

U.S. Pat. No. 8,950,313 (Kenney, 2015) and U.S. Pat. No. 9,328,981 (Kenney, 2016) both provide a gas system for an autoloading firearm in which the gas used to cycle the weapon is restricted automatically via a mechanical shutoff actuated by the installation of a suppressor on the weapon. A gas block installed on the firearm contains a spring-loaded plunger assembly that is oriented parallel to a bore in the barrel. The mounting of a suppressor over the muzzle depresses the regulator plunger, thereby driving it rearward, which in turn blocks one of the gas ports in the gas block to reduce the volume of propellant gases emitted into the system.

U.S. Pat. No. 9,134,082 (Brown, 2015) discloses a firearm with an indirect gas impingement system in which a piston is disposed within a chamber defined by a housing. A receiver is coupled to the first end of the hand guard, and a bolt carrier is disposed within the receiver. A carrier key is attached to the bolt carrier and moves concurrently within it between the firing and rearward positions with the carrier key extending outwardly above the bolt carrier and along the piston axis. A rod is permanently affixed to the carrier key and extends along the piston axis to a distal end. The piston is adjacent the distal end when in the static position and engages the distal end when moving to the displaced position, which moves the bolt carrier from the firing position to the rearward position.

It is an object of the present invention to provide a firearm operating system that combines the advantages of a recoil operating system with an integrated gas-assist system to eliminate virtually all recoil and significantly improve accuracy. It is a further object of the present invention to provide an operating system that can be used with long-, medium- and short-barrel firearms.

BRIEF SUMMARY OF THE INVENTION

The present invention is a firearm comprising a barrel assembly, a forward receiver, and a receiver brake; wherein the barrel assembly is located inside of the forward receiver; wherein the barrel assembly comprises a barrel, a compression spring, a gas tube, a front bushing, and a rear bushing; wherein the gas tube is situated around the barrel between the front and rear bushings and is not attached to the barrel; wherein the compression spring is situated around the barrel between the front and rear bushings and inside of the gas tube; wherein both the front and rear bushings are fixedly attached to the forward receiver; wherein the barrel comprises a gas port; wherein the gas port is covered by a gas regulator and is in fluid communication with a gas chamber; wherein the gas chamber is situated between the front bushing and the gas regulator; wherein the gas regulator is fixedly attached to the barrel; wherein the barrel has a circumference, and the gas regulator extends around the entire circumference of the barrel and is surrounded by the gas tube; wherein the gas tube terminates in the front bushing; and wherein the receiver brake is fixedly attached to the forward receiver on a distal end of the forward receiver, the receiver brake comprising one or more interior baffles extending laterally across a width of the receiver brake, each of the baffles having a central bore that is configured to allow passage of a projectile through the central bore after the projectile exits a distal end of the barrel.

In a preferred embodiment, the front bushing is configured to create an air-tight seal around the barrel, thereby allowing the barrel to move rearward without loss of pressurization in the gas chamber during firearm cycling. Preferably, the gas port is situated at a rearward end of the gas chamber, and the gas regulator is configured to form a ceiling and a rear wall of the gas chamber.

In an alternate embodiment, the present invention is a firearm comprising a barrel assembly, a forward receiver, and a receiver brake; wherein the barrel assembly is located inside of the forward receiver; wherein the barrel assembly comprises a barrel, a rear bushing that is affixed to the forward receiver, a compression spring, a combined gas regulator and gas tube, and an extended barrel bushing tube with a forward flange; wherein the receiver brake abuts up against a distal surface of the forward flange of the extended barrel bushing tube; wherein the compression spring surrounds the barrel and is situated around the outside of the combined gas regulator and gas tube; wherein a distal end of the compression spring abuts up against a forward flange of the combined gas regulator and gas tube; wherein the combined gas regulator and gas tube extends from the forward flange of the combined gas regulator and gas tube to a center of the barrel; wherein a proximal end of the combined gas regulator and gas tube covers a gas port that is configured to provide a fluid communication between a bore in the barrel and a gas chamber; wherein the forward flange of the combined gas regulator and gas tube is situated against the forward flange of the extended barrel bushing tube; wherein the forward flange of the extended barrel bushing tube is affixed to the forward receiver at a muzzle end of the barrel; wherein the barrel is fixedly attached to the combined gas regulator and gas tube at a proximal end of the combined gas regulator and gas tube; and wherein the receiver brake is fixedly attached to the forward receiver on a distal end of the forward receiver, the receiver brake comprising one or more interior baffles extending laterally across a width of the receiver brake, each of the baffles having a central bore that is configured to allow passage of a projectile through the central bore after the projectile exits a distal end of the barrel.

In a preferred embodiment, the forward flange of the combined gas regulator and gas tube is configured to act as a gas regulator knob by adjusting a volume of gas emitted into the gas chamber via the gas port when the combined gas regulator and gas tube is rotated. Preferably, the barrel forms a rear wall of the gas chamber and a proximal end of the extended barrel bushing tube forms a front wall of the gas chamber, and and the combined gas regulator and gas tube forms a ceiling of the gas chamber. At maximum spring compression, the gas port is preferably situated forward of the rear bushing. The gas port is preferably situated at a rear-most end of the gas chamber.

In an alternate embodiment, the present invention is a firearm comprising a barrel assembly, a forward receiver, and a receiver brake; wherein the barrel assembly is located inside of the forward receiver; wherein the barrel assembly comprises a barrel, an extension spring, a combined gas regulator and gas tube, and an extended barrel bushing tube; wherein the extended barrel bushing tube is affixed to the forward receiver; wherein the extension spring lies between a rear flange of the combined gas regulator and gas tube and a forward flange of the extended barrel bushing tube; wherein the receiver brake abuts up against a distal surface of the forward flange of the extended barrel bushing tube; wherein a proximal end of the extension spring abuts up against and is affixed to the rear flange of the combined gas regulator and gas tube; wherein a distal end of the extension spring abuts up against and is affixed to the forward flange of the extended barrel bushing tube; wherein the rear flange of the combined gas regulator and gas tube is fixedly attached to the barrel; wherein the forward flange of the extended barrel bushing tube is affixed to the forward receiver; and wherein the receiver brake is fixedly attached to the forward receiver on a distal end of the forward receiver, the receiver brake comprising one or more interior baffles extending laterally across a width of the receiver brake, each of the baffles having a central bore that is configured to allow passage of a projectile through the central bore after the projectile exits a distal end of the barrel.

In a preferred embodiment, the combined gas regulator and gas tube comprises a gas tube portion and a gas regulator portion, and the gas tube portion extends forward of the gas regulator portion. Preferably, the combined gas regulator and gas tube forms a ceiling of the gas chamber, the barrel forms a rear wall of the gas chamber, and a proximal end of the extended barrel bushing tube forms a front wall of the gas chamber. At maximum spring extension, the gas port is preferably situated forward of the rear flange of the combined gas regulator and gas tube. At maximum spring extension, the combined gas regulator and gas tube and the extended barrel bushing tube are preferably configured to overlap, thereby preventing the gas chamber from losing pressurization.

In an alternate embodiment, the present invention is a firearm comprising a barrel assembly, a forward receiver, and a receiver brake; wherein the barrel assembly is located inside of the forward receiver; wherein the barrel assembly comprises two compression springs, a rear bushing, an external gas cylinder, and a piston rod; wherein the rear bushing is affixed to the forward receiver; wherein the external gas cylinder is secured to the barrel; wherein the two compression springs are situated external to the barrel without encircling it; wherein a proximal end of each of the two compression springs abuts up against the rear bushing; wherein a proximal end of the piston rod forms a gas chamber; wherein the barrel comprises a gas port that is in fluid communication with the gas chamber; and wherein the receiver brake is fixedly attached to the forward receiver on a distal end of the forward receiver, the receiver brake comprising one or more interior baffles extending laterally across a width of the receiver brake, each of the baffles having a central bore that is configured to allow passage of a projectile through the central bore after the projectile exits a distal end of the barrel.

In a preferred embodiment, the external gas cylinder is affixed to the barrel with two collars that encircle the barrel and are affixed to the gas cylinder, and a distal end of each of the two compression springs terminates in a recess in the forward collar. Preferably, the rear-most of the two collars is configured to regulate the volume of gas entering the gas chamber via the gas port.

REFERENCE NUMBERS

Figure 1:
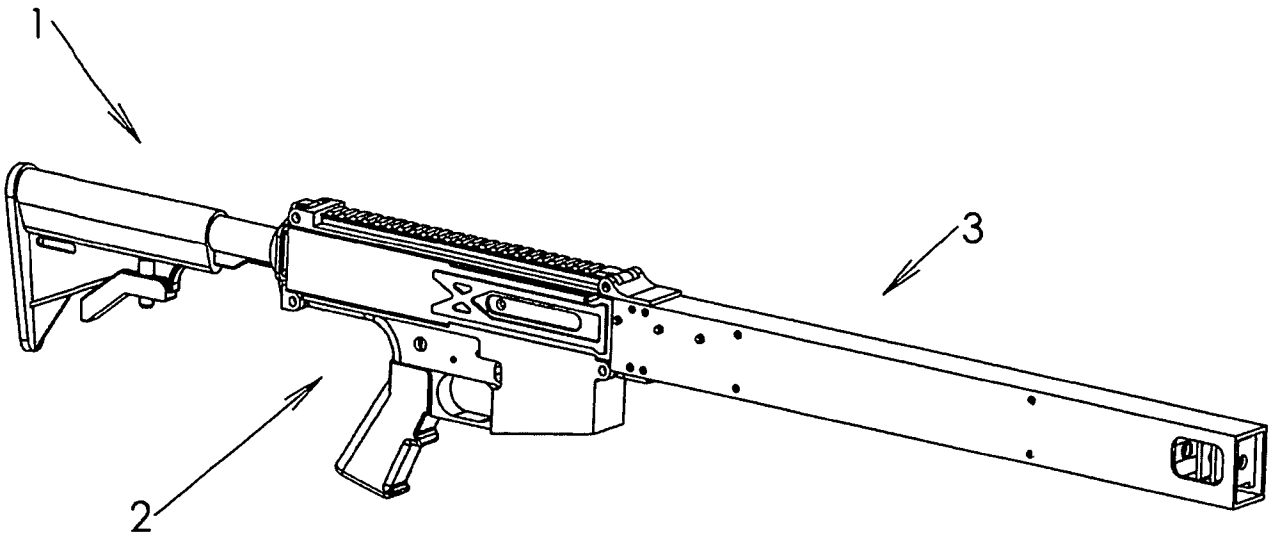
FIG. 1 is a perspective view of the long-barrel embodiment of the present invention shown attached to the stock end of a firearm.

1 Stock
2 Main/lower receiver
3 Forward receiver or shroud
4 Barrel

5 Receiver brake
6 Bracket
7 Rail
8 Gas tube
9 Front bushing
10 Rear bushing
11 Compression spring
12 Gas chamber
13 Gas port
14 Gas regulator
15 Rear bushing
16 Compression spring
17 Combined gas regulator/gas tube
18 Gas port
19 Gas chamber
20 Extended barrel bushing tube
21 Extension spring
22 Combined gas regulator/gas tube
23 Extended barrel bushing tube
24 Gas chamber
25 Gas port
26 Rear bushing
27 External gas cylinder
28 Compression spring
29 Collar
30 Gas chamber
31 Gas port
32 Piston rod

DETAILED DESCRIPTION OF INVENTION

A. Overview

In semi-automatic firearms, energy is needed to cycle the operating system. The present invention is based on a recoil operating system, which allows the barrel to move in relation to the rest of the firearm and in relation to the shooter. The present invention also incorporates an integrated gas-assist system in which the barrel itself acts as the gas piston.

Typical modern firearms have fixed barrels, which means that any recoil (as an equal and opposite reaction to the fired projectile) is transferred directly to the receiver and then to the shooter, unless it is reduced by a muzzle brake or an external mechanism. Because muzzle brakes and other external recoil-reducing mechanisms have a limited effect, fixed barrel firearms are ultimately limited in performance as they cannot fire ammunition with high energy output without unacceptable levels of discomfort to the shooter.

One drawback of recoil operating systems is the possibility of reduced reliability due to differences in the energy balance between the fired round and the operating system demand. These differences may arise because of different ammunition or varying weapon conditions, such as fouling or heating. If the firearm has a fixed energy balance system, then variations in the energy input or output can result in either misfires or excess recoil. The present invention overcomes these disadvantages by incorporating an integrated gas-assist system and receiver brake into a recoil operating system.

In the present invention, the gas-assist system is similar to a gas-piston operating system (such as is described in some of the prior art examples discussed above) except that it works in conjunction with the recoil system rather than independently of it. The gas-assist system of the present invention uses the barrel, which is already moving as a function of barrel recoil, as the piston and effectively uses the firearm receiver as the piston housing. When barrel recoil does not prove sufficient energy to cycle the action, the gas-assist system provides the rest of the energy needed to do so without increasing any recoil effect on the shooter. Depending on the balance of weight between the moving, operating parts and the stationary firearm receiver, the gas-assist system may in fact reduce the recoil felt by the shooter by pulling the receiver forward during the firing cycle.

The receiver brake of the present invention functions similarly to a conventional muzzle brake except that the barrel is free to recoil, applying recoil energy to the operating system, while the receiver brake acts on the receiver, pulling it forward to reduce felt recoil at the same moment at which the barrel begins to move rearward. Through the use of appropriate springs, which are described more fully below, the energy of both systems (the recoil system and the gas-assist system) is balanced, and recoil is either completely neutralized or drastically reduced.

Long recoil operation of firearms has been in existence for over 100 years. In these systems, at the moment of firing, the barrel recoils rearward, propelled by the energy of the fired projectile. The moving barrel pushes the bolt and carrier rearward, compressing two spring assemblies, the barrel return spring assembly and the bolt return spring assembly. During this action, the hammer is usually cocked. At the end of the barrel travel, the bolt is held to the rear while the barrel is allowed to return forward, powered by the previously-compressed barrel return spring(s). The movement of the barrel away from the bolt and carrier separates the bolt from the barrel chamber, extracts the spent cartridge, and allows that cartridge to be ejected. Once the barrel returns forward, the bolt and carrier are released to return forward (in closed bolt systems), and that process feeds and chambers a round, preparing the weapon for subsequent firing. There are some variations to this system, but the principle of utilizing the barrel's recoil to energize the operating system is the common factor in recoil-operated systems.

The integrated gas-assist system of the present system provides additional operating energy and further reduces recoil. This system is novel in that it uses the barrel as the piston and the receiver as the cylinder. Specifically, the present invention transforms the firearm into a pneumatic actuator by: (i) using the firearm receiver as the cylinder (or body) by means of a gas tube that is fixed relative to the receiver; and (ii) using the barrel as a piston by powering it rearward in relation to the receiver. A gas regulator that is fixed to the barrel acts as the plunger and can be adjusted to allow different amounts of gas to enter the cylinder chamber (that is, the inside of the receiver), which is similar to the process used in gas-operated firearms. A bushing that is situated around the barrel and fixed to the receiver provides the necessary last piece of the closed system.

In operation, the sequence of [event] *events* is as follows. First, pressurized gas pushes the projectile down the barrel. When the projectile passes the gas port in the barrel, the pressurized gas flows through the port (as controlled by the gas regulator) and enters the closed chamber created by the barrel bushing on the forward end, the gas tube around the exterior of the barrel, and the gas regulator on the rear end of the gas chamber. As the chamber is pressurized and the projectile continues to move down the barrel toward the muzzle, the barrel bushing (which is attached to the receiver) is pushed forward, and the gas regulator (which is attached to the barrel) is pushed rearward. As a result, the barrel is actuated, applying work against the friction of the operating system and compressing the return springs that restore the operating system to the [staring] *starting* position. At the same moment, the projectile exits the barrel, reducing the gas pressure, and the recoil acts on the barrel, providing the rest of the energy needed to cycle the operating system. The operating cycle is completed, and all parts return to the starting position by means of the return springs, closing the gas-assist chamber and preparing it for additional firing.

The present invention encompasses four distinct embodiments of the same concept: a long gas-assist system (or "long system"), a medium gas-assist system (or "medium system"), a short gas-assist system (or "short system"), and an external gas-assist system (or "external system"). All four of these embodiments incorporate the gas-assist system with a recoil operating system. The description set forth in the preceding paragraph applies to the long, medium and short system embodiments of the present invention. All four embodiments are discussed more fully below in relation to the figures.

B. Detailed Description of the Figures

FIG. 1 is a perspective view of the long-barrel embodiment of the present invention shown attached to the stock end of a firearm. As shown in this figure, the firearm comprises a stock 1, a main/lower receiver 2, a forward receiver 3 (also referred to herein as the "shroud"), and a barrel 4 (not shown) located inside of the forward receiver 3. The present invention relates primarily to the barrel 4, which is shown in further detail in subsequent figures.

Figure 2:
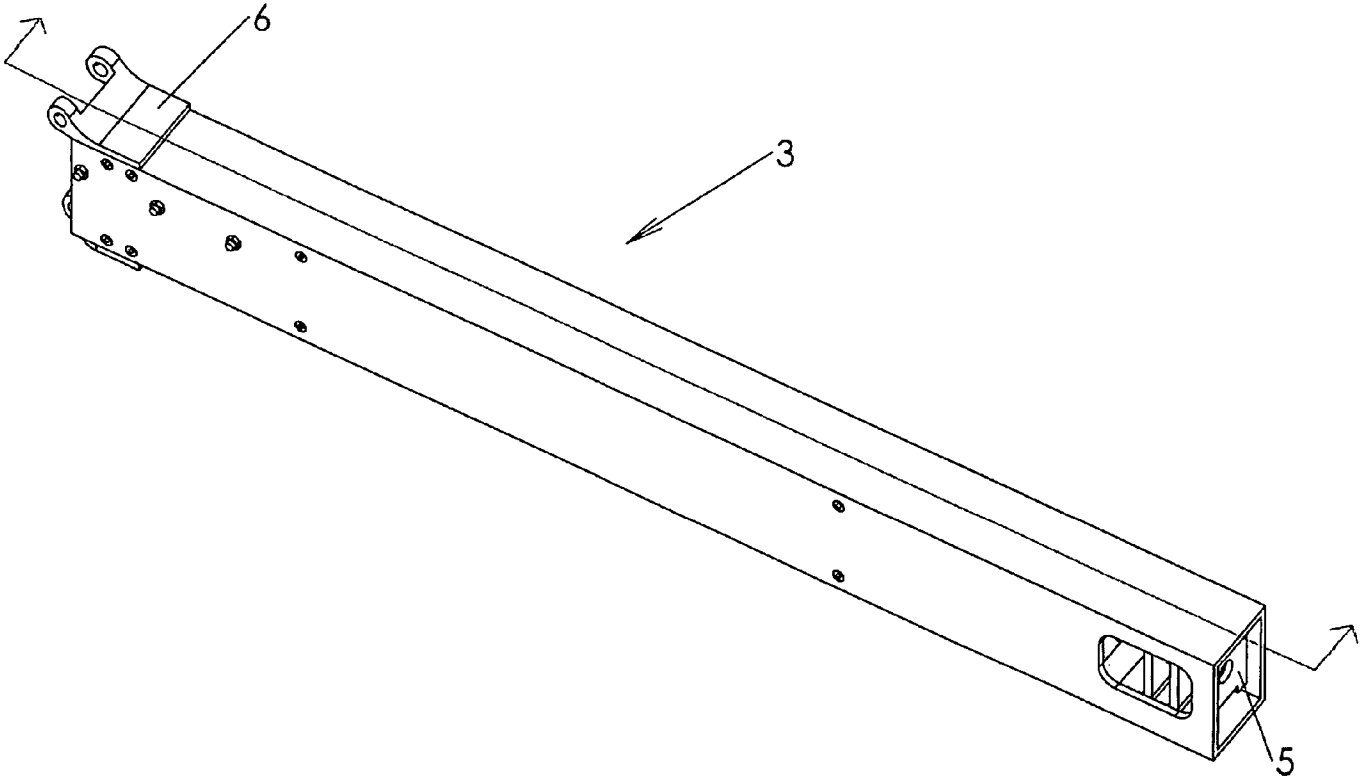
FIG. 2 is a perspective view of the forward receiver and barrel assembly only in the long-barrel embodiment of the present invention.

FIG. 2 is a perspective view of the forward receiver and barrel assembly only in the long-barrel embodiment of the present invention. Although the forward receiver or shroud 3 is shown here as being rectangular in shape, the present invention is not limited to any particular shape of the shroud. Located inside of the distal end of the shroud 3 is a receiver brake 5. In this particular embodiment, the shroud 3 is attached to the main receiver 2 (not shown) with brackets 6; however, the present invention is not limited to any particular method of attaching the shroud 3 to the main receiver. This figure also shows the section line for FIG. 5.

Figure 3:
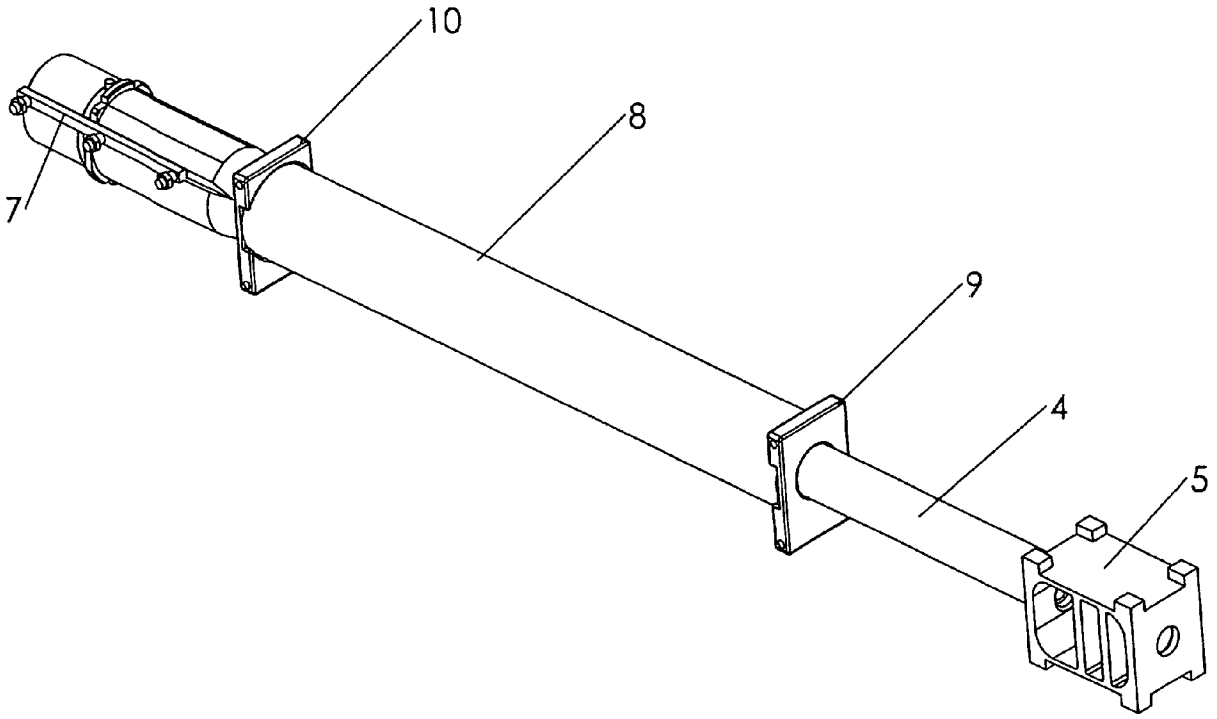
FIG. 3 is a perspective view of the barrel assembly only in the long-barrel embodiment of the present invention.

FIG. 3 is a perspective view of the barrel assembly only in the long-barrel embodiment of the present invention. The receiver brake 5 is clearly visible on the muzzle or distal end of the barrel 4, and the rails 7 on the proximal end of the barrel are also shown. These rails 7 are omitted from subsequent figures, but they are present in all four embodiments, and they serve to hold the inner parts of the barrel assembly in place and to prevent the barrel from twisting. As shown in this figure, the inner parts of the barrel assembly include a gas tube 8, a front bushing 9, the barrel 4, and a rear bushing 10 (which also acts as a spring depressor). The gas tube 8 is situated around the barrel 4 between the front and rear bushings 9, 10. The purpose of each of these parts is discussed below.

Figure 4:
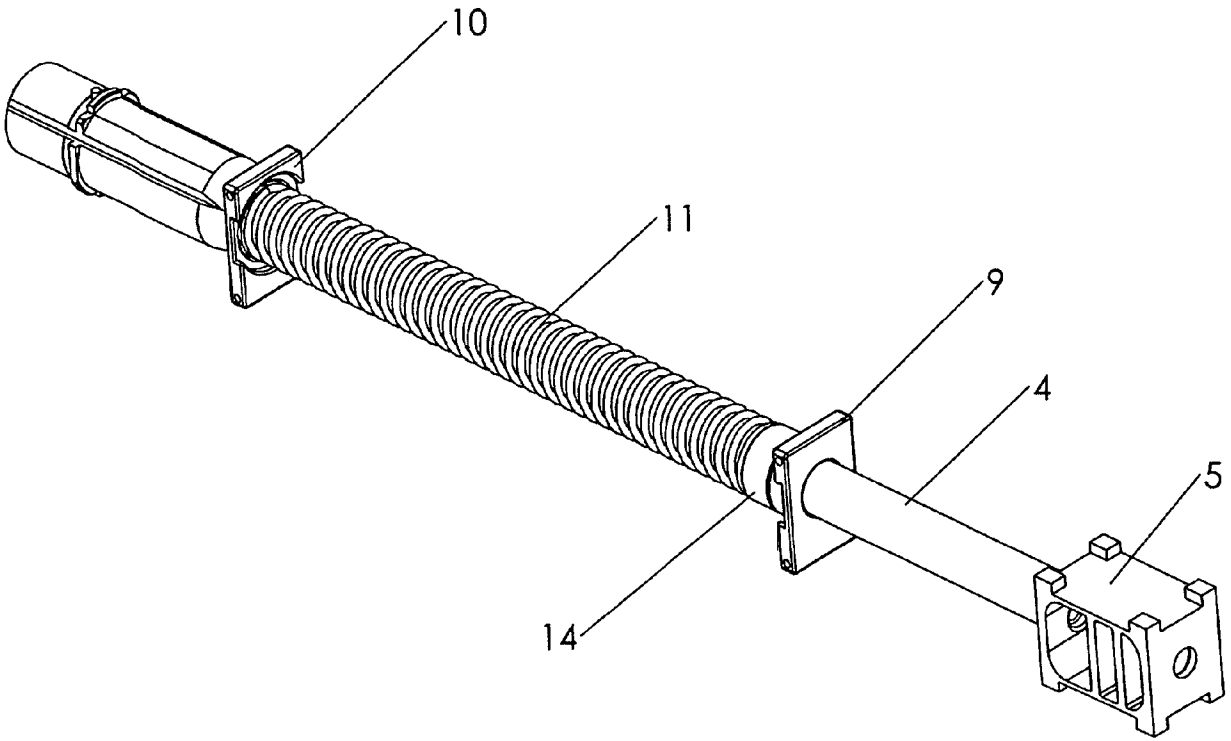
FIG. 4 is a perspective view of the barrel assembly only with the gas tube removed in the long-barrel embodiment of the present invention.

FIG. 4 is a perspective view of the barrel assembly only with the gas tube removed in the long-barrel embodiment of the present invention. As shown in this figure, a compression spring 11 is situated around the barrel 4 between the front and rear bushings 9, 10 and inside of the gas tube 8 (omitted from this figure). Both of the bushings 9, 10 are fixedly attached to the forward receiver 3. The front bushing 9 creates an air-tight seal around the barrel 4, allowing it to move rearward without the loss of pressurization in the gas chamber during the cycle. With the gas tube 8 removed, the gas regulator 14 is also visible. The mechanism of the spring 11 is discussed in connection with FIGS. 5-8.

Figure 5:
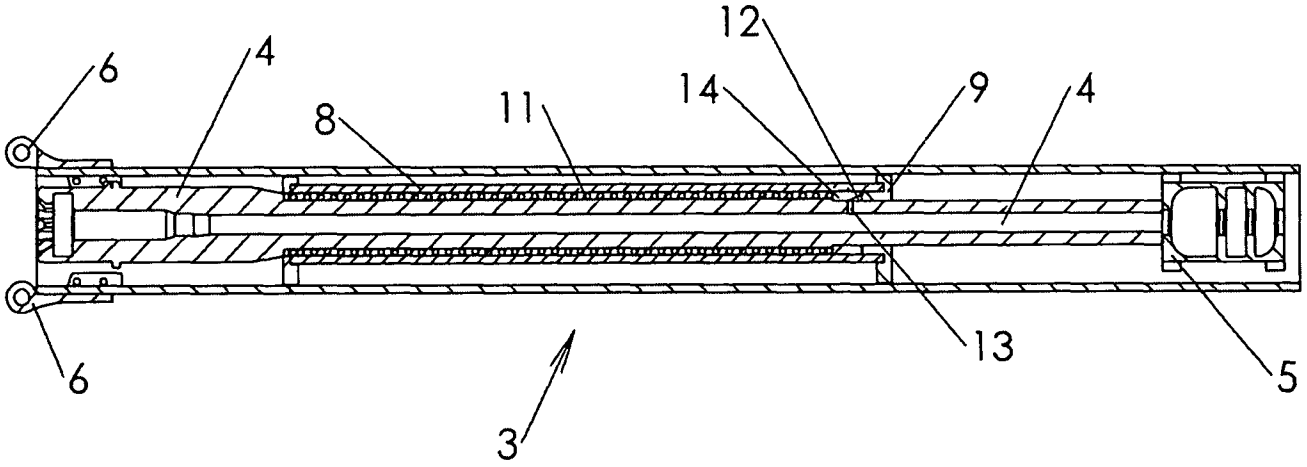
FIG. 5 is a section view of the barrel assembly shown in FIG. 2 taken at the section line shown in FIG. 2 with the barrel in a pre-fire position.
Figure 32:
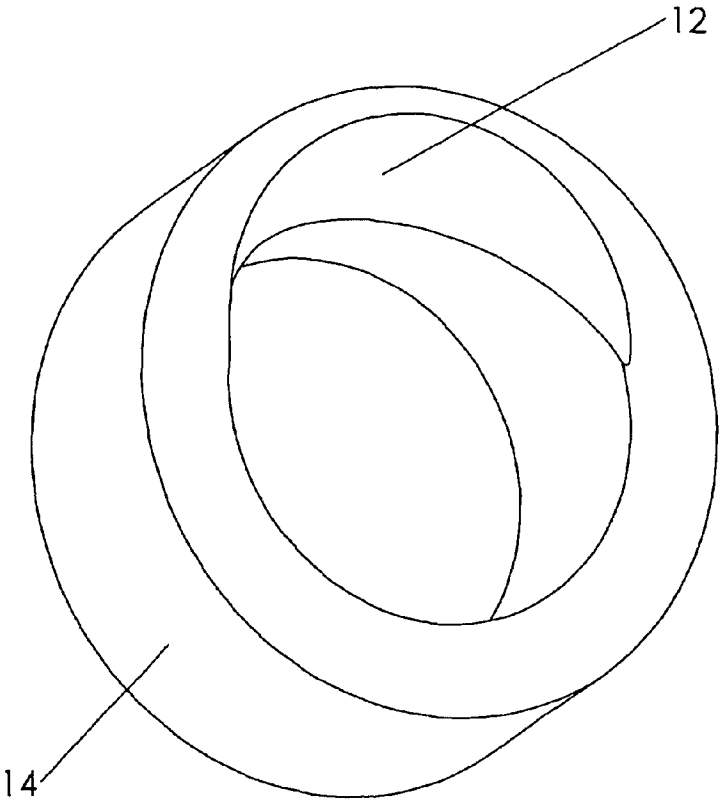
FIG. 32 is a detail perspective view of the gas regulator/gas port of the long-barrel embodiment of the present invention.

FIG. 5 is a section view of the barrel assembly shown in FIG. 2 taken at the section line shown in FIG. 2 with the barrel in a pre-fire position. In this position, the compression spring 11 is in a relaxed (uncompressed) state. As the round is fired, gas enters a gas chamber 12 from the barrel 4 via a gas port 13 in the barrel 4 (see FIG. 32 for a detail perspective view of the cut-out in the gas regulator 14, which forms the gas chamber 12). Note that the gas port 13 is covered by the gas regulator 14 but is in fluid communication with the gas chamber 12 (this is shown more clearly in FIGS. 6 and 8). The gas chamber 12 is situated between the front bushing 9 and the gas regulator 14, which is attached to the barrel with a set screw (not shown). As gas enters the gas chamber 12 via the gas port 13, the increasing pressure of the gas in the gas chamber 12 pushes the gas regulator 14 rearward, and the spring 11 is compressed toward the rear gas bushing 10. Because the gas regulator 14 is fixedly attached to the barrel 4, the barrel moves rearward as well. In a preferred embodiment, the compression spring 11 is long enough to allow the complete cycle travel distance of the barrel before reaching maximum spring compression, and it is also strong enough to return the barrel fully forward, into battery, after pulling it away from the bolt carrier and bolt, thereby causing the extraction of the spent cartridge. The distance by which the barrel moves rearward is limited by a buffer piston (not shown) at the shooter end of the main receiver 2.

Figure 6:
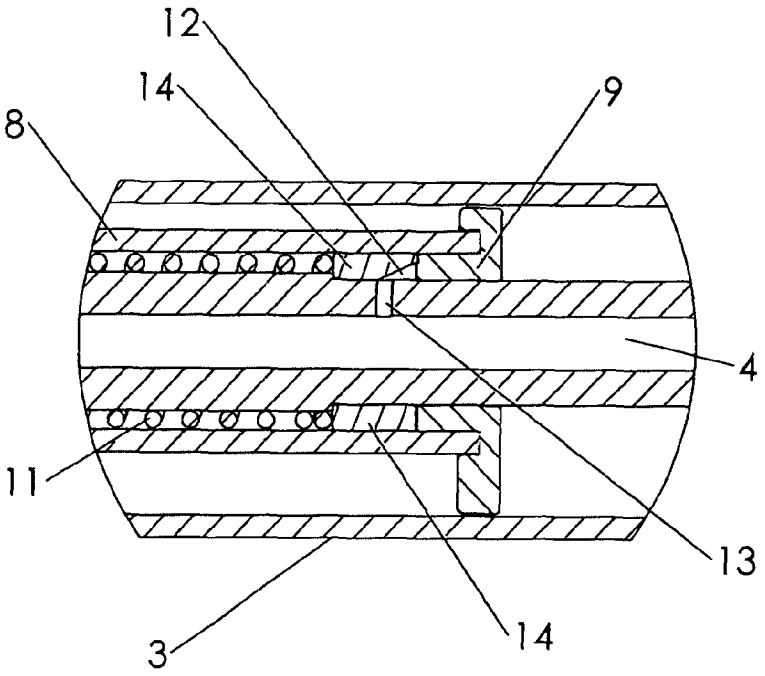
FIG. 6 is a detail view of the gas port end of the barrel assembly cross-section view shown in FIG. 5.

FIG. 6 is a detail view of the gas port end of the barrel assembly cross-section view shown in FIG. 5. As shown in this figure, the gas regulator 14 extends around the entire circumference of the barrel 4 and is surrounded by the gas tube 8, which terminates in the front bushing 9.

Figure 7:
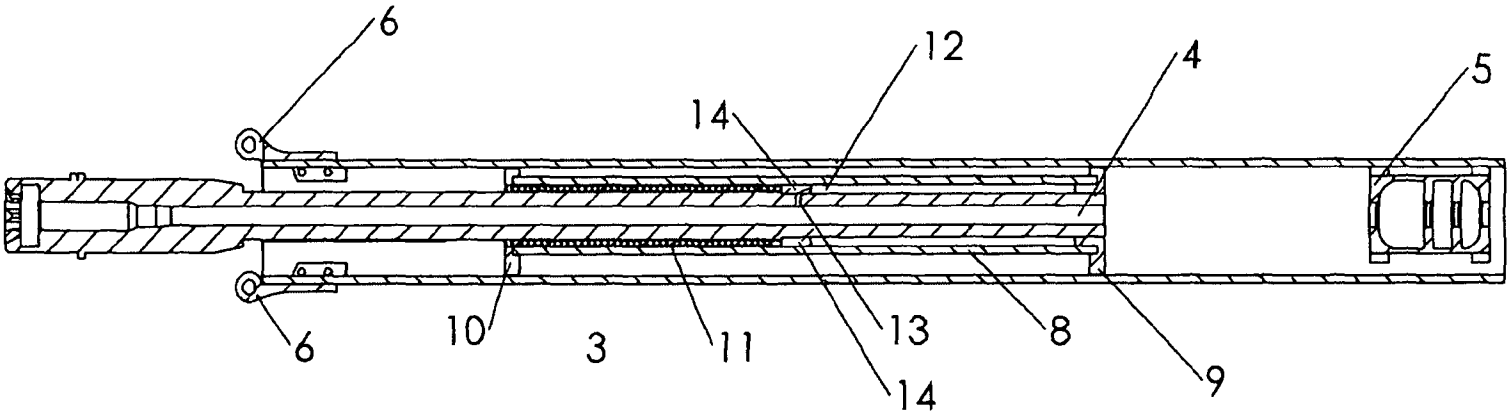
FIG. 7 is a section view of the barrel assembly shown in FIG. 2 taken at the section line shown in FIG. 2 with the barrel in a mid-fire position.

FIG. 7 is a section view of the barrel assembly shown in FIG. 2 taken at the section line shown in FIG. 2 with the barrel in a mid-fire position. In this figure, the spring 11 is fully compressed by the gas that entered the gas chamber 12 from the barrel 4. Note that the front and rear gas bushings 9, 10 remain stationary (because they are affixed to the forward receiver 3), as does the gas tube 8. Only the barrel 4 moves rearward by virtue of the compression of the spring 11. The distance between the front and rear gas bushings 9, 10 is fixed and is approximately equal to the length of the gas tube 8 that sits between them. Note that the gas tube 8 is not attached to the barrel 4; rather, the barrel 4 slides longitudinally within the gas tube. The compression spring 11 is under tension even when the barrel is in battery, which ensures that the barrel is in the correct position when the bolt and carrier (not shown) move forward to chamber a round.

Figure 8:
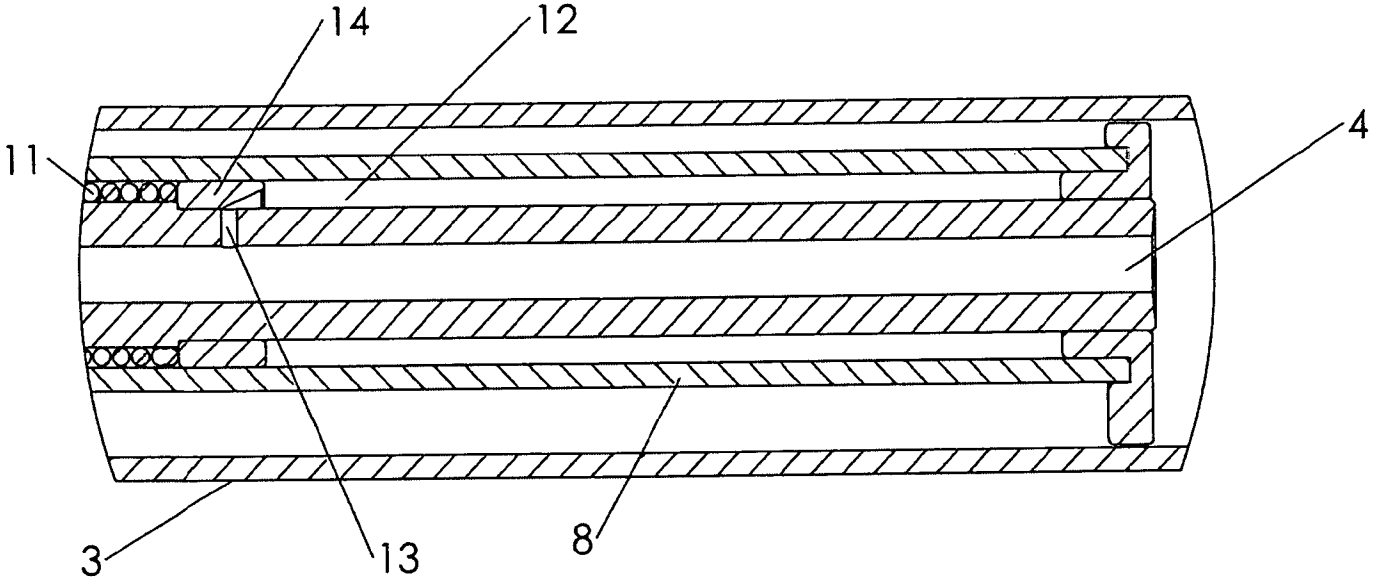
FIG. 8 is a detail view of the gas port end of the barrel assembly cross-section view shown in FIG. 7.

FIG. 8 is a detail view of the gas port end of the barrel assembly cross-section view shown in FIG. 7. Note that the gas regulator 14 moves rearward as gas enters the gas chamber 12, thereby compressing the spring 11. Note also that the gas port 13 is preferably situated at the rearward end of the gas chamber 12 and underneath/forward of the gas regulator 14, as shown. In other words, the gas regulator 14 (or, in an alternate embodiment, an extension thereof) acts as both the ceiling and the rear wall of the gas chamber 12.

Figure 9:
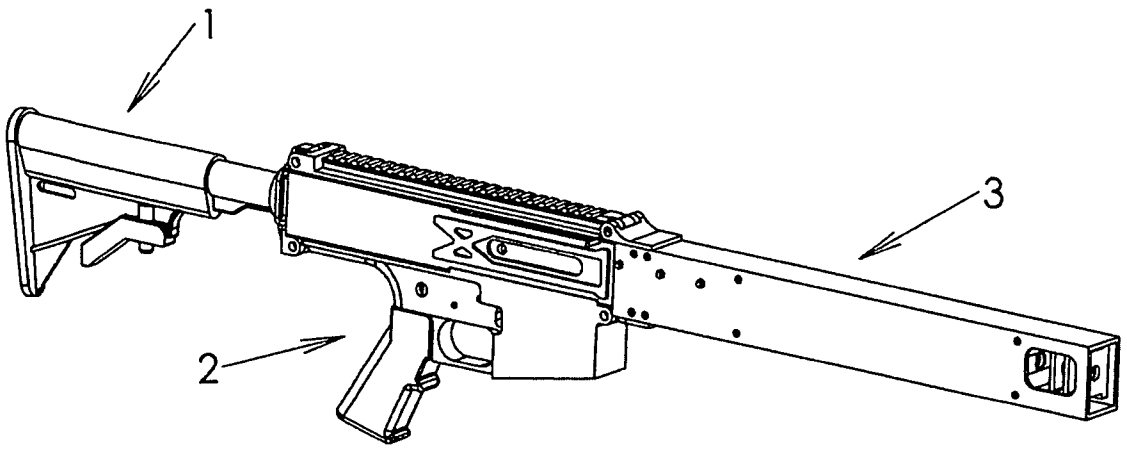
FIG. 9 is a perspective view of the medium-barrel embodiment of the present invention shown attached to the stock end of a firearm.

FIG. 9 is a perspective view of the medium-barrel embodiment of the present invention shown attached to the stock end of a firearm. The difference between this and the previous embodiment is that the forward receiver or shroud 3 is shorter than in the long-barrel embodiment.

Figure 10:
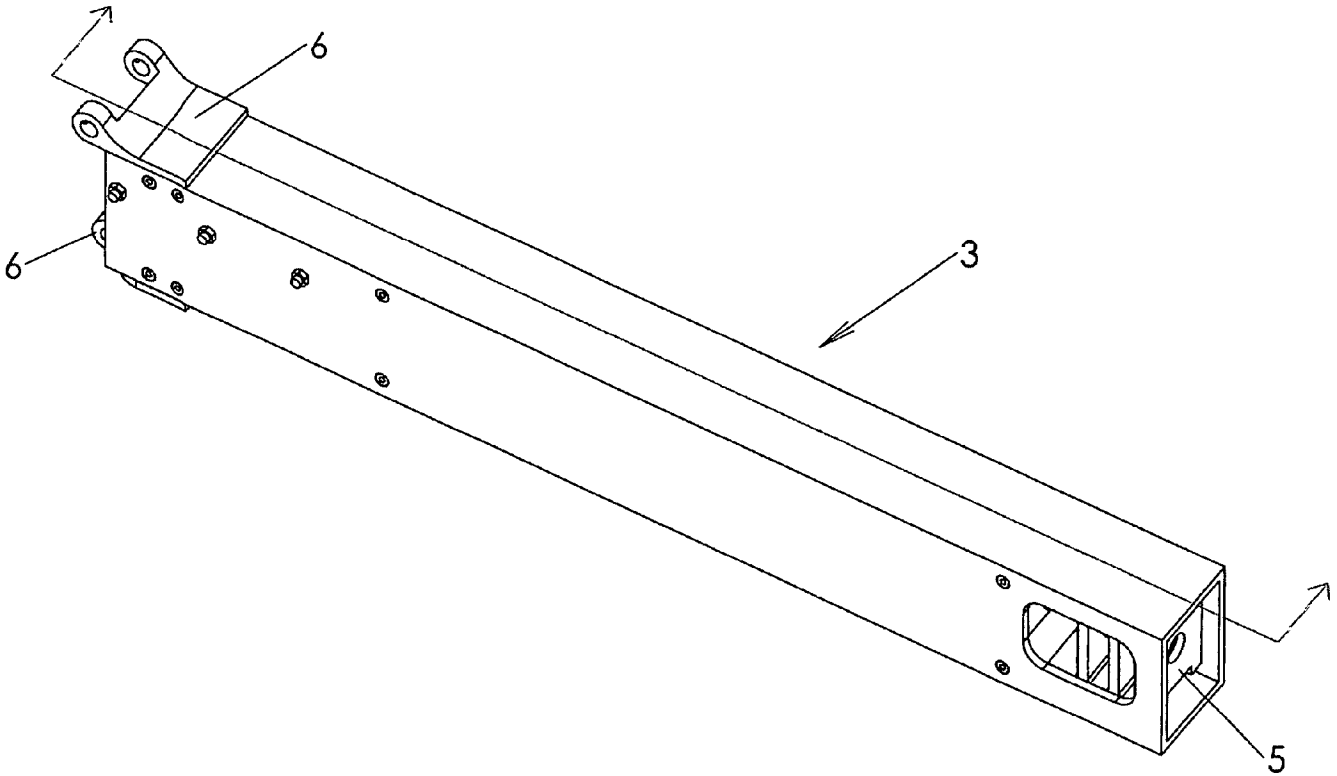
FIG. 10 is a perspective view of the forward receiver and barrel only in the medium-barrel embodiment of the present invention.

FIG. 10 is a perspective view of the forward receiver and barrel assembly only in the medium-barrel embodiment of the present invention. This figure is similar to FIG. 2 except that the receiver brake 5 abuts up against the distal (or forward-facing) surface of the forward flange of the extended barrel bushing tube 20 (see FIG. 11), whereas in the long-barrel embodiment, there is a length of barrel 4 between the front bushing 9 and receiver brake 5 (see FIG. 3).

Figure 11:
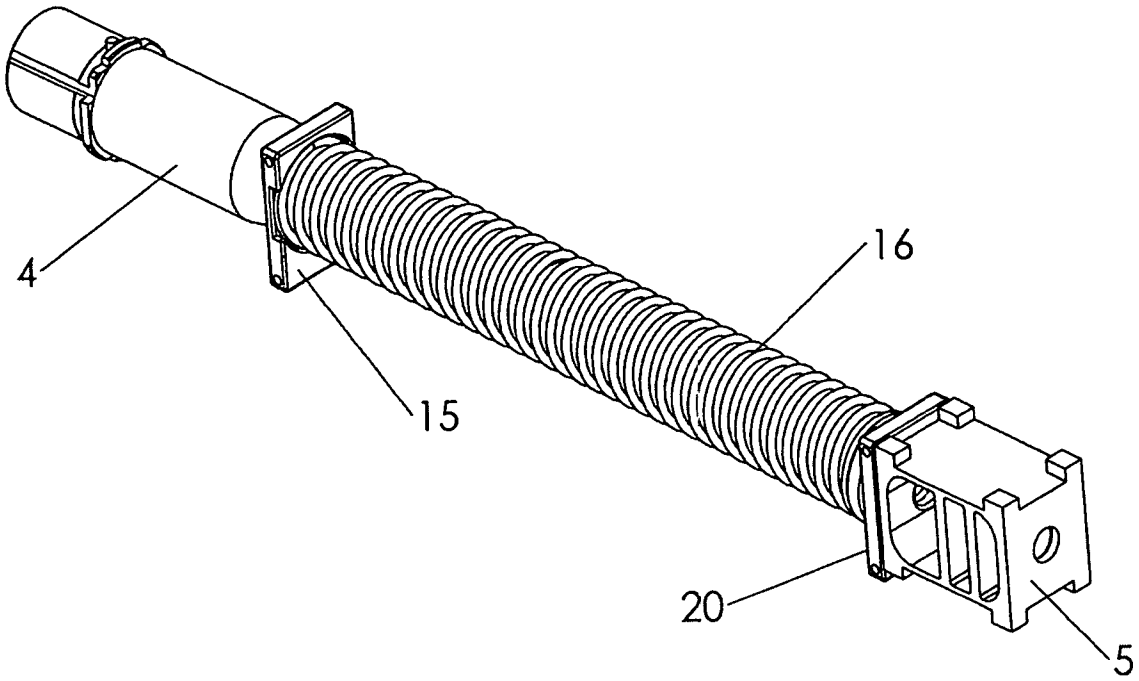
FIG. 11 is a perspective view of the barrel assembly only in the medium-barrel embodiment of the present invention.

FIG. 11 is a perspective view of the barrel assembly only in the medium-barrel embodiment of the present invention. As shown in this figure, the compression spring 16 is situated around the outside of the combined gas regulator and tube 17 (see FIG. 12) rather than on the inside of the gas tube 9, as in the long-barrel embodiment. In this embodiment, the compression spring 16 is preferably long enough to allow the complete cycle travel distance of the barrel before reaching maximum spring compression. In addition, the compression spring 16 is preferably strong enough to return the barrel fully forward, into battery, after pulling it away from the bolt carrier and bolt, thereby causing the extraction of the spent cartridge. As in the long-barrel embodiment, the compression spring 16 is under tension even when the barrel is in battery, ensuring that the barrel is in the correct position when the bolt and carrier move forward to chamber a round.

Figure 12:
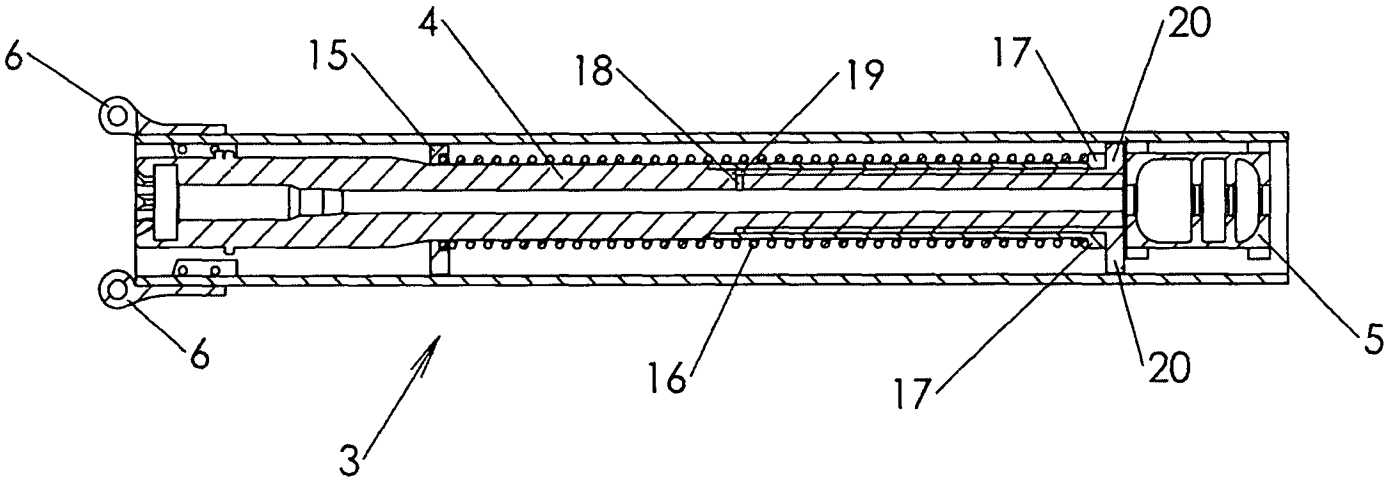
FIG. 12 is a section view of the barrel assembly shown in FIG. 10 taken at the section line shown in FIG. 10 with the barrel in a pre-fire position.

FIG. 12 is a section view of the barrel assembly shown in FIG. 10 taken at the section line shown in FIG. 10 with the barrel in a pre-fire position. The medium-barrel embodiment comprises a rear bushing 15 (which also acts as a spring depressor) that is affixed to the shroud 3, a compression spring 16 that surrounds the barrel 4 and the combined gas regulator and gas tube 17, and an extended barrel bushing tube 20. The proximal (or rearward) end of the compression spring 16 abuts up against the rear bushing 15. The distal (or forward) end of the compression spring 16 abuts up against a forward flange on the combined gas regulator/gas tube 17, which extends from the forward flange to approximately the center of the barrel 4. Note that the proximal end of the combined gas regulator/gas tube 17 covers the gas port 18 that provides a fluid communication between the bore in the barrel 4 (through which the projectile travels) and the gas chamber 19.

The forward flange of the combined gas regulator/gas tube 17 is situated against a forward flange on the extended barrel bushing tube 20, the latter of which is affixed to the shroud 3 at the muzzle end of the barrel. This flange 17 doubles as a gas regulator knob that can be turned by the operator to adjust the gas-assist strength without weapon disassembly. Both the rearward bushing 15 and the extended barrel bushing tube 20 are stationary, whereas the combined gas regulator/gas tube 17 moves with the barrel 4. The combined gas regulator/gas tube 17 is preferably long enough to house the extended barrel bushing tube 20 (with the exception of its forward flange) and allow the barrel 4 and combined gas regulator/gas tube 17 to move rearward together for the length of the cycle travel distance without separating from the extended barrel bushing tube 20.

Figure 13:
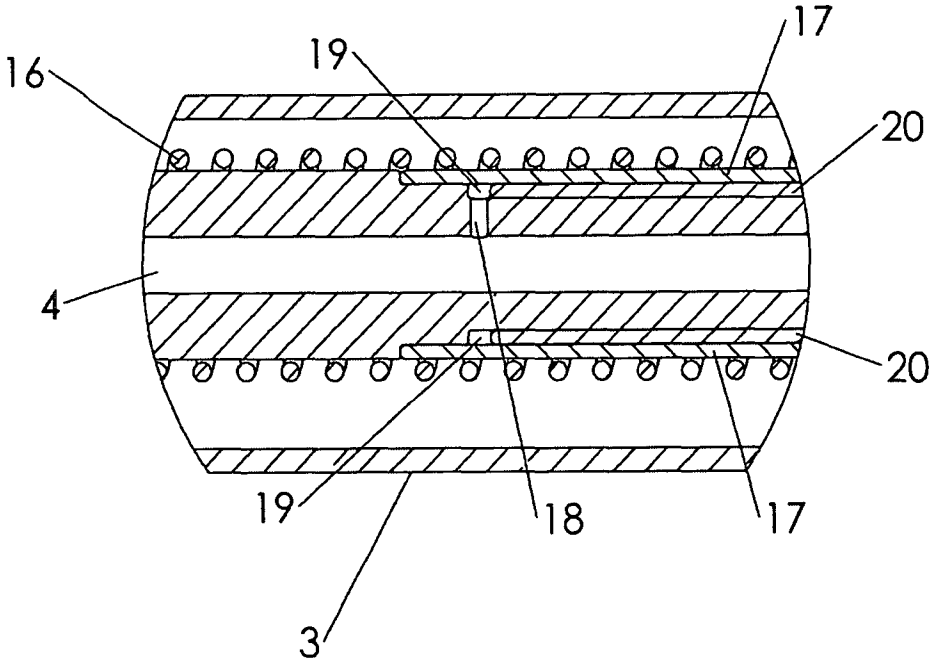
FIG. 13 is a detail view of the gas port section of the barrel assembly cross-section view shown in FIG. 12.

FIG. 13 is a detail view of the gas port section of the barrel assembly cross-section view shown in FIG. 12. This figure clearly shows the gas port 18 in relation to the barrel 4, gas chamber 19, combined gas regulator/gas tube 17, and extended barrel bushing tube 20.

Figure 14:
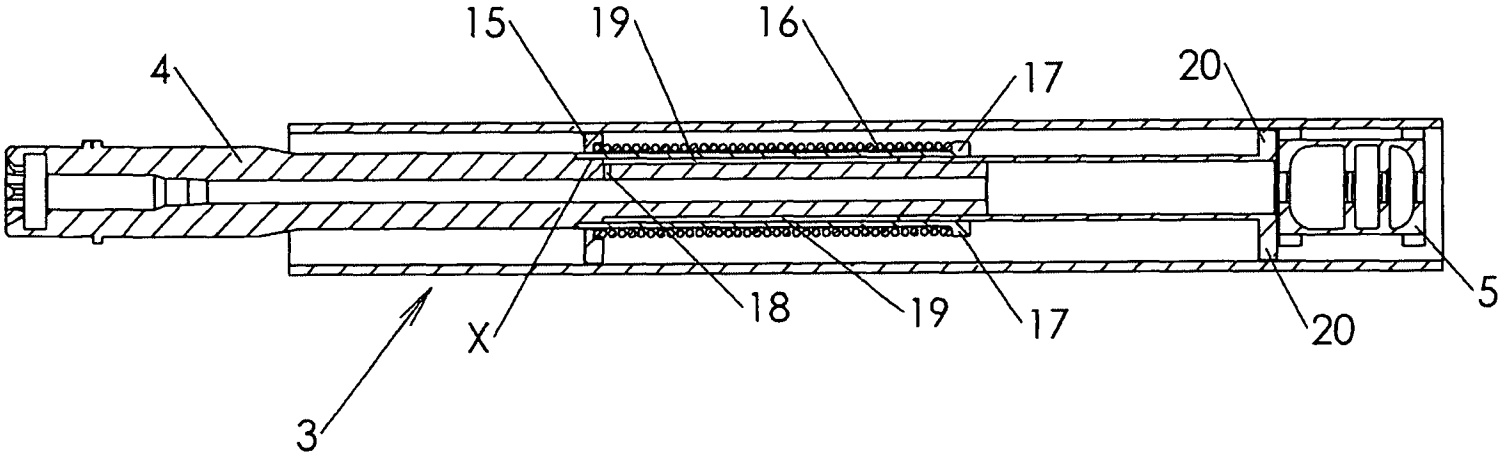
FIG. 14 is a section view of the barrel assembly shown in FIG. 10 taken at the section line shown in FIG. 10 but with the barrel in a mid-fire position.

FIG. 14 is a section view of the barrel assembly shown in FIG. 10 taken at the section line shown in FIG. 10 but with the barrel in a mid-fire position. As illustrated in this figure, as gas travels from the bore in the barrel 4 through the gas port 18 and into the gas chamber 19, the volume of the gas chamber 19 increases until the compression spring 16 is fully compressed against the rear bushing 15, and the barrel 4 is pushed rearward by the increasing pressure in the gas chamber 19. Note that the barrel itself forms the rear wall of the gas chamber 19, and the proximal end of the extended barrel bushing tube 20 forms the front wall of the gas chamber 19. The combined gas regulator/gas tube 17 forms the ceiling of the gas chamber 19; the volume of gas emitted into the gas chamber 19 via the gas port 18 can be adjusted by rotating or twisting the combined gas regulator/gas tube 17. The barrel 4 is fixedly attached to the combined gas regulator/gas tube 17 at the proximal end of the combined gas regulator/gas tube 17 (designated as "X" on FIG. 14). As the combined gas regulator/gas tube 17 moves rearward, the forward flange of the combined gas regulator/gas tube 17 compresses the compression spring 16. In other words, as gas enters the gas chamber 18, it pushes the barrel 4 and extended barrel bushing tube 20 apart.

Figure 15:
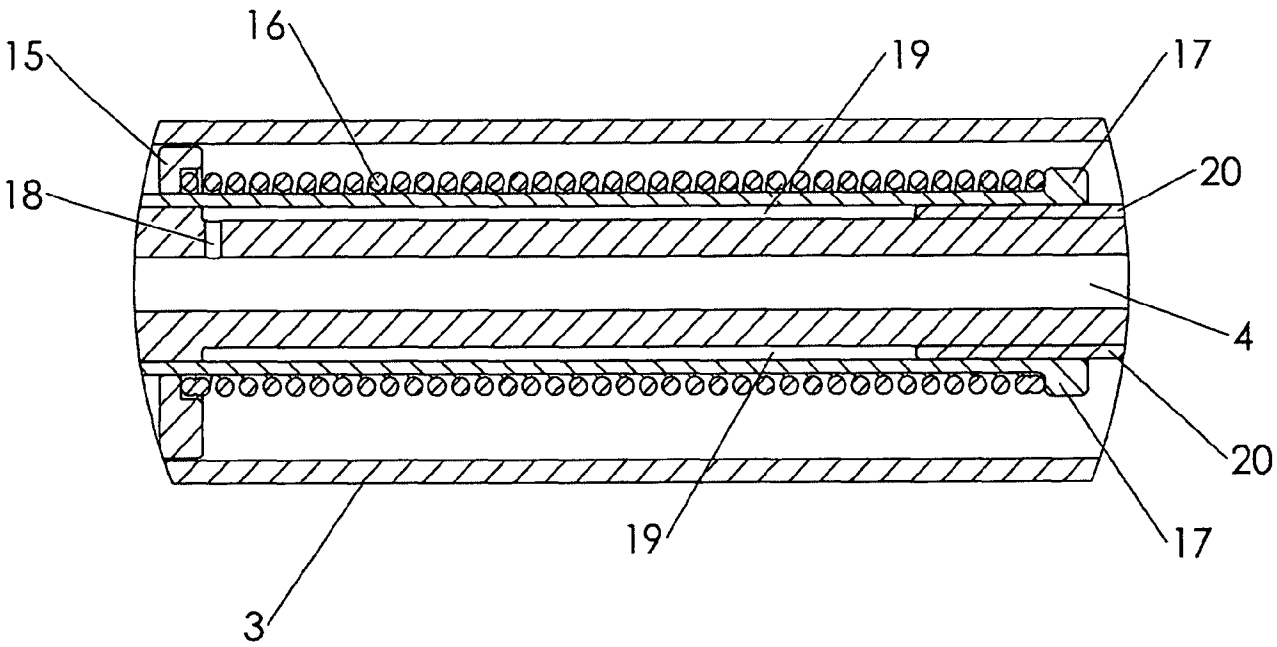
FIG. 15 is a detail view of the gas port section of the barrel assembly cross-section view shown in FIG. 14.

FIG. 15 is a detail view of the gas port section of the barrel assembly cross-section view shown in FIG. 14. As shown in this figure, at maximum spring compression, the gas port 18 is situated just forward of the rear bushing 15. The gas port 18 is situated at the rear-most end of the gas chamber 19.

Figure 16:
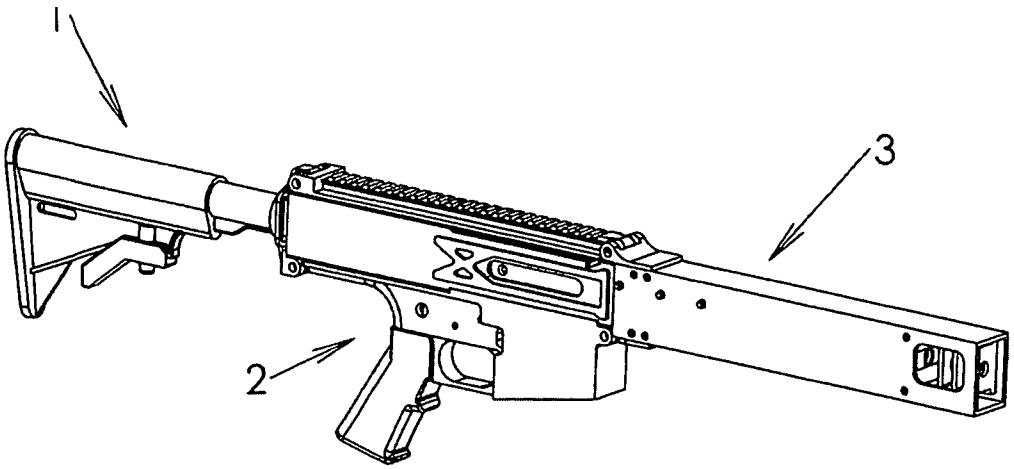
FIG. 16 is a perspective view of the short-barrel embodiment of the present invention shown attached to the stock end of a firearm.

FIG. 16 is a perspective view of the short-barrel embodiment of the present invention shown attached to the stock end of a firearm. A compared to the long- and medium-barrel embodiments, the length of the barrel is even shorter in the short-barrel embodiment.

Figure 17:
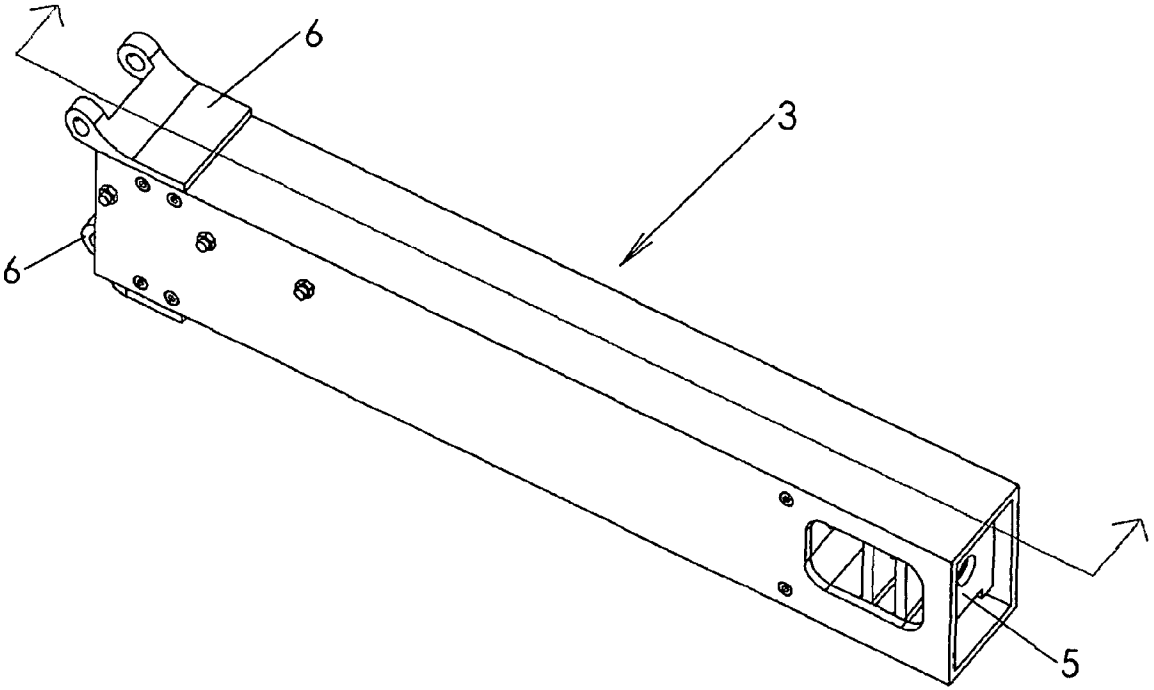
FIG. 17 is a perspective view of the forward receiver and barrel assembly only in the short-barrel embodiment of the present invention.

FIG. 17 is a perspective view of the forward receiver and barrel assembly only in the short-barrel embodiment of the present invention. As is apparent from this figure (more particularly, the bolt holes in the shroud 3), the embodiment does not have a rear bushing 10, 15, as in previous embodiments.

Figure 18:
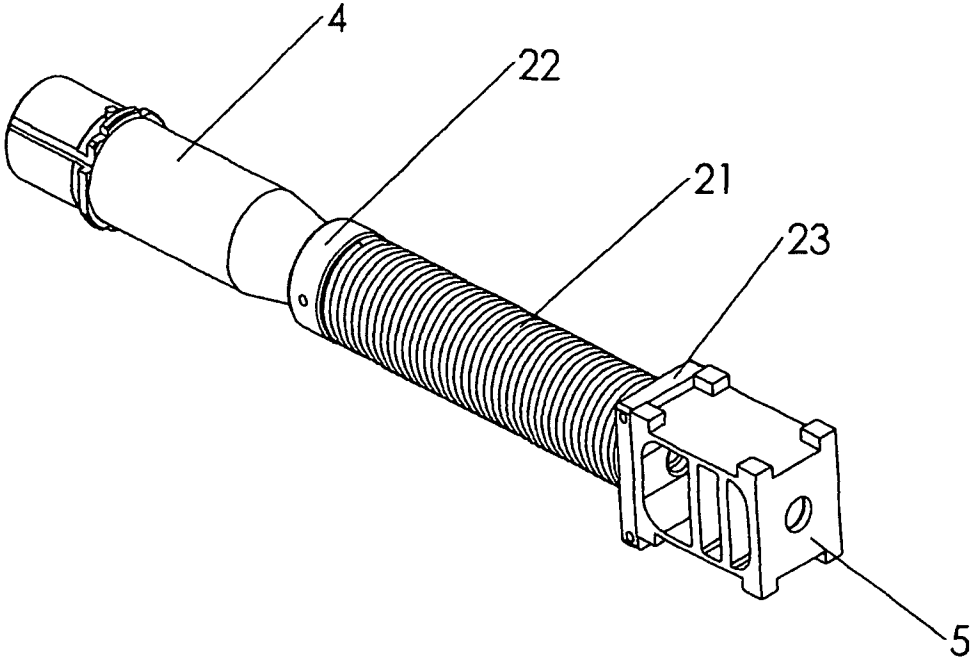
FIG. 18 is a perspective view of the barrel assembly only in the short-barrel embodiment of the present invention.

FIG. 18 is a perspective view of the barrel assembly only in the short-barrel embodiment of the present invention. In this embodiment, an extension spring 21 lies between the rear flange of the combined gas regulator/gas tube 22 and the forward flange of the extended barrel bushing tube 23, which is affixed to the shroud 3. The receiver brake 5 abuts up against the distal (or forward-facing) surface of the forward flange of the extended barrel bushing tube 23.

Figure 19:
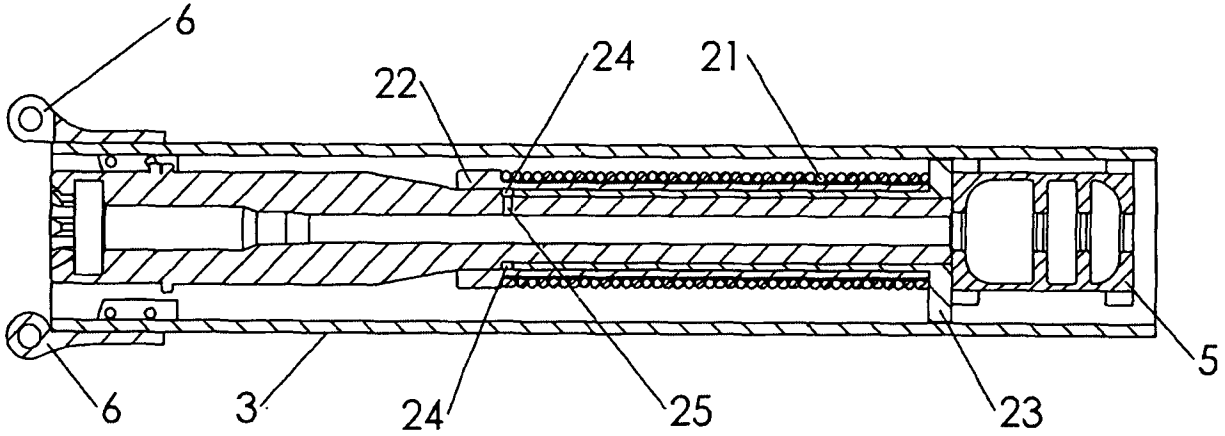
FIG. 19 is a section view of the barrel assembly shown in FIG. 17 taken at the section line shown in FIG. 17 with the barrel in a pre-fire position.

FIG. 19 is a section view of the barrel assembly shown in FIG. 17 taken at the section line shown in FIG. 17 with the barrel in a pre-fire position. As shown in this figure, this embodiment incorporates a combined gas regulator/gas tube 22, as in the medium-barrel embodiment, except that the gas tube extends forward of the gas regulator rather than rearward (as in the medium-barrel embodiment). In this embodiment, the knob (or flange) on the combined gas regulator/gas tube 22 is situated on the rear end of the gas regulator/gas tube 22, as opposed to the front end, as in the medium-barrel embodiment. The proximal (rearward) end of the extension spring 21 abuts up against and is affixed to the rear flange of the combined gas regulator/gas tube 22, and the distal (or forward) end of the extension spring 21 abuts up against and is affixed to the forward flange of the extended barrel bushing tube 23. The rear flange of the combined gas regulator/gas tube 22 is fixedly attached to the barrel 4.

As gas enters the gas chamber 24 via the gas port 25, the increasing gas pressure within the gas chamber 24 causes the barrel 4 and extended barrel bushing tube 23 to be pushed apart from one another. Because the forward flange of the extended barrel bushing tube 23 is affixed to the shroud 3, the barrel 4 moves rearward with the combined gas regulator/gas tube 22.

Figure 20:
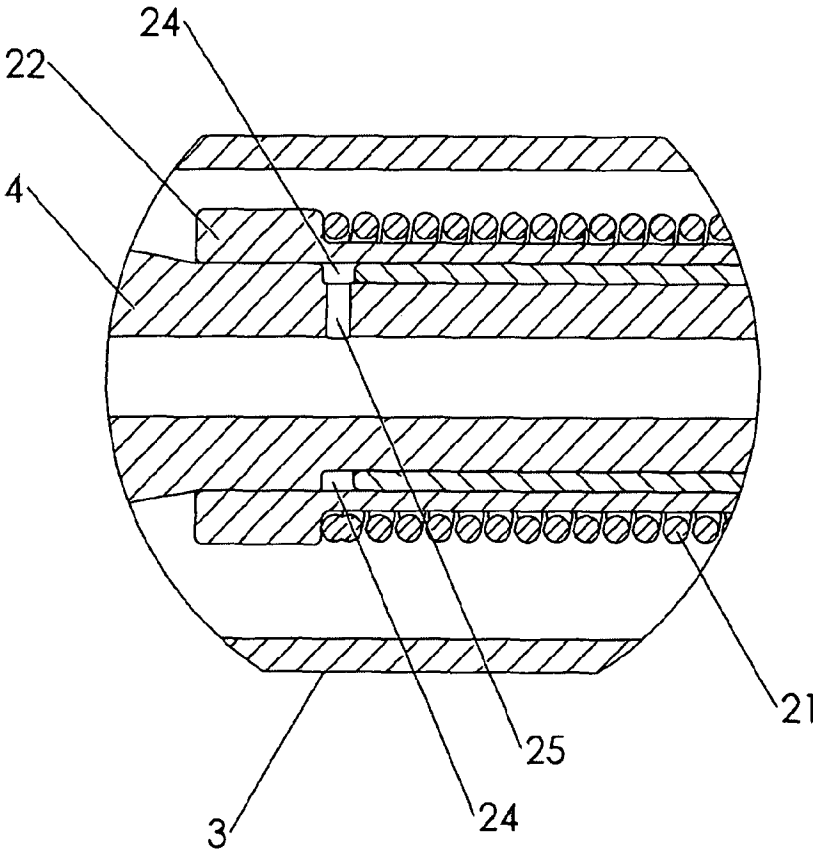
FIG. 20 is a detail view of the gas port end of the barrel assembly cross-section view shown in FIG. 19.

FIG. 20 is a detail view of the gas port end of the barrel assembly cross-section view shown in FIG. 19. Note that the combined gas regulator/gas tube 22 forms the ceiling of the gas chamber 24, the barrel 4 forms the rear wall of the gas chamber 24, and the proximal (or rearward) end of the extended barrel bushing tube 23 forms the front wall of the gas chamber 24.

Figure 21:
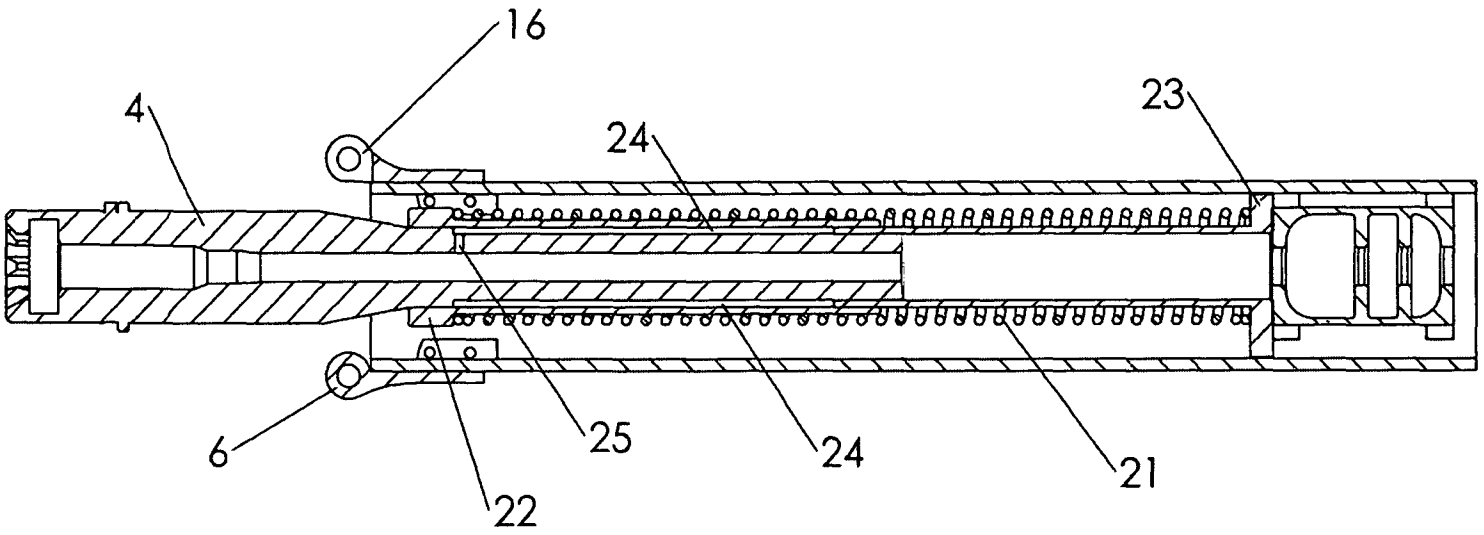
FIG. 21 is a section view of the barrel assembly shown in FIG. 17 taken at the section line shown in FIG. 17 but with the barrel in a mid-fire position.

FIG. 21 is a section view of the barrel assembly shown in FIG. 17 taken at the section line shown in FIG. 17 but with the barrel in a mid-fire position. As shown in this figure, the volume of the gas chamber 24 increases until the barrel runs out of energy or its backward movement is arrested by a buffer piston (not shown) on the buttstock side of the main receiver 2. Once the gas pressure within the gas chamber 24 starts to dissipate, the force of the extension spring 21 causes the barrel 4 to travel forward again, closing the gap (this gap being the gas chamber 24) between the barrel 4 and the extended barrel bushing tube 23. As in the medium-barrel embodiment, the combined gas regulator/gas tube 22 can be rotated or twisted to control the amount of gas entering the gas chamber 24 from the barrel.

Figure 22:
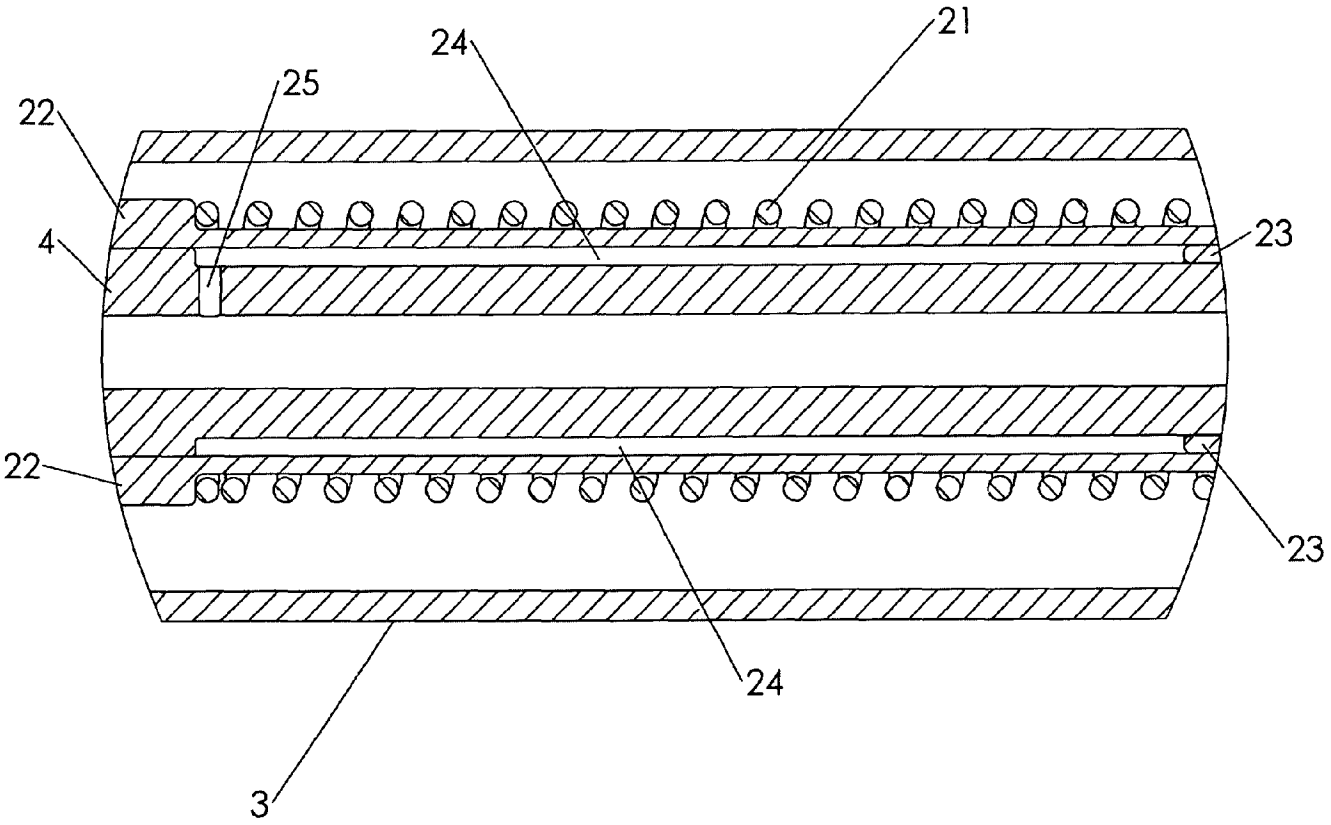
FIG. 22 is a detail view of the gas port end of the barrel assembly cross-section view shown in FIG. 21.

FIG. 22 is a detail view of the gas port end of the barrel assembly cross-section view shown in FIG. 21. As shown in this figure, at maximum spring extension, the gas port 25 is situated just forward of the rear flange of the combined gas regulator/gas tube 22. FIGS. 21 and 22 show that, at full extension, mid-firing cycle, the gas regulator/gas tube 22 and extended barrel bushing tube 23 still overlap, thereby preventing the gas chamber from opening and losing pressurization.

Figure 23:
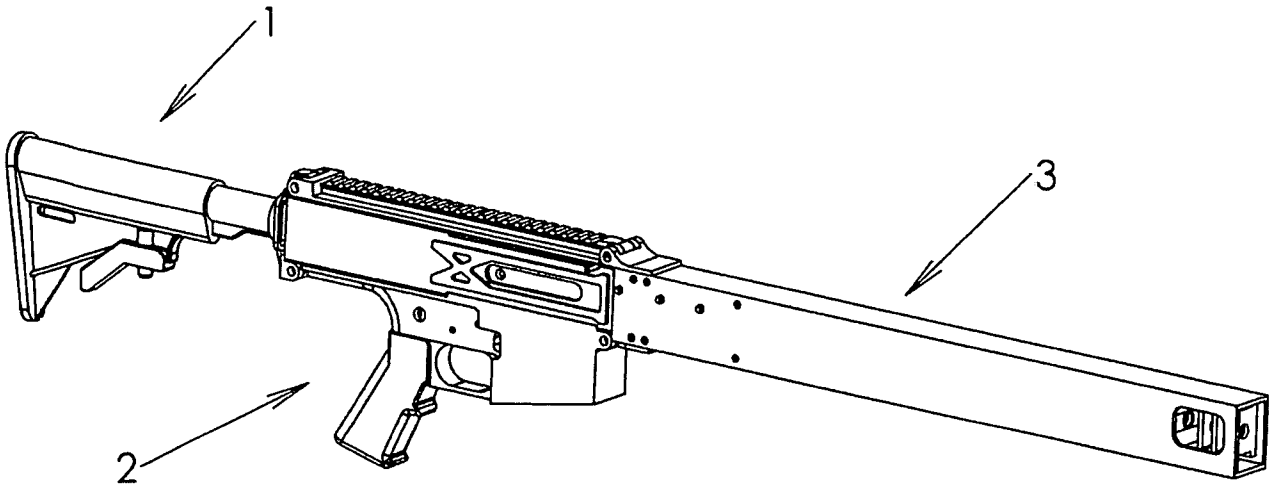
FIG. 23 is a perspective view of the external-barrel embodiment of the present invention shown attached to the stock end of a firearm.
Figure 24:
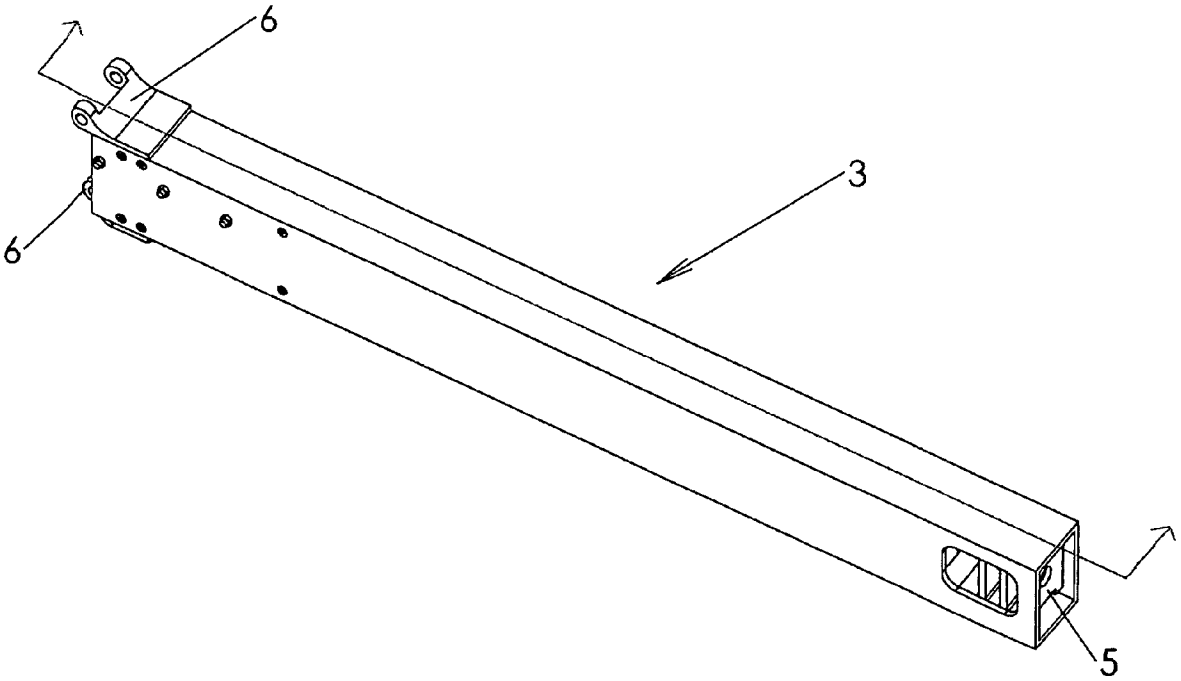
FIG. 24 is a perspective view of the forward receiver and barrel assembly only in the external-barrel embodiment of the present invention.

FIG. 23 is a perspective view of the external-barrel embodiment of the present invention shown attached to the stock end of a firearm. As compared to FIG. 1, this figure omits the two vertically aligned bolt holes shown on the distal end of the barrel. This is because this particular embodiment does not include a front bushing 9, as in the long-barrel embodiment. FIG. 24 is a perspective view of the forward receiver and barrel assembly only in the external-barrel embodiment of the present invention.

Figure 25:
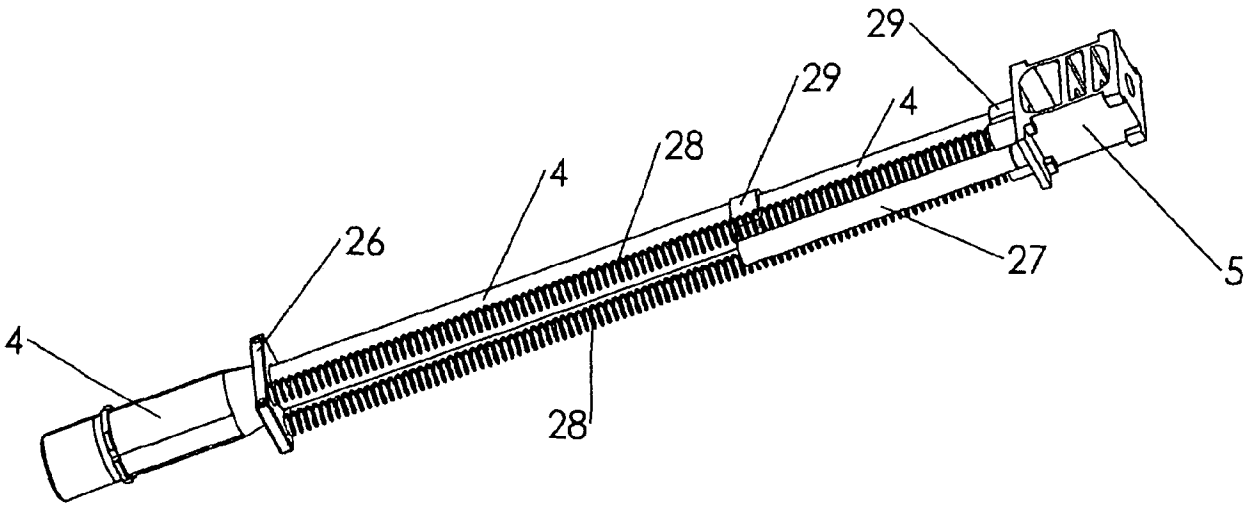
FIG. 25 is a perspective view of the barrel assembly only in the external-barrel embodiment of the present invention.
Figure 30:
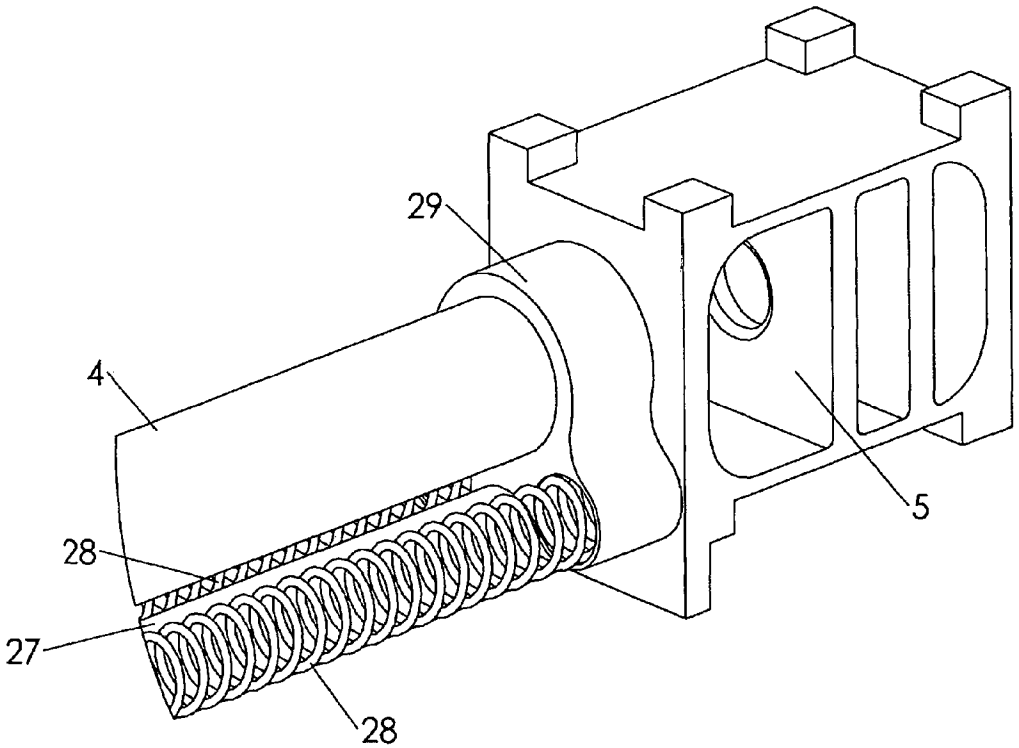
FIG. 30 is a detail perspective view of the distal end of the compression springs in the external-barrel embodiment of the present invention.

FIG. 25 is a perspective view of the barrel assembly only in the external-barrel embodiment of the present invention. As shown in this figure, this embodiment comprises a barrel 4, a rear bushing 26 that is affixed to the shroud 3, an external gas cylinder 27 that is secured to the barrel 4, two compression springs 28, and a receiver brake 5. The gas cylinder 27 is affixed to the barrel 4 with two collars 29 that encircle the barrel 4 and are affixed to the gas cylinder 27. The two compression springs 28 are situated external to the barrel 4 rather than encircling it, as in previous embodiments. The proximal (rearward) end of each compression 28 spring abuts up against the rear bushing 26 (which also acts as a spring depressor), and the distal (forward) end of each compression spring 28 terminates in a recess in the forward collar 29 (see FIG. 30). The rear-most of the two collars 29 acts as a gas regulator.

Although omitted for clarity purposes, each of the two compression springs 28 surrounds a telescoping spring guide rod assembly (not shown) that keep the compression springs 28 in place and prevents them from bowing outward when compressed. On the forward end, the spring guide rod assembly is secured to the barrel; on the rear end, it is secured to the receiver. Each spring guide rod assembly is comprised of an outer tube and an inner rod, which fit together telescopically, and a compression spring that is configured to bias the spring guide rod assembly in an extended position. Similar guide rod assemblies are used in other firearms, such as the telescopic rod found in an AK47 rifle.

Figure 26:
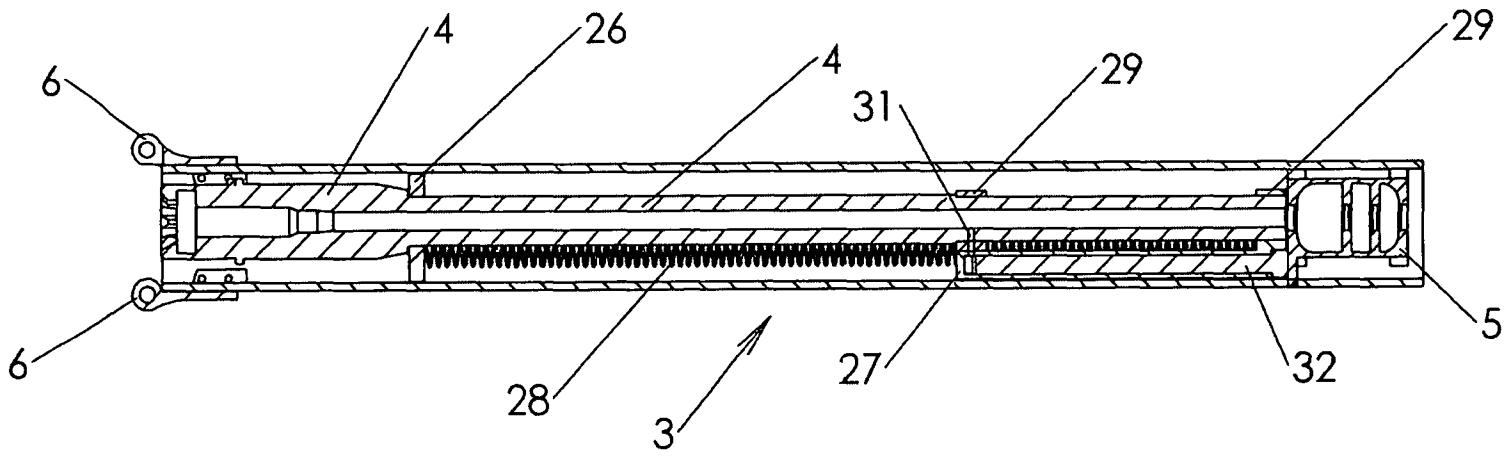
FIG. 26 is a section view of the barrel assembly shown in FIG. 24 taken at the section line shown in FIG. 24 with the barrel in a pre-fire position.
Figure 31:
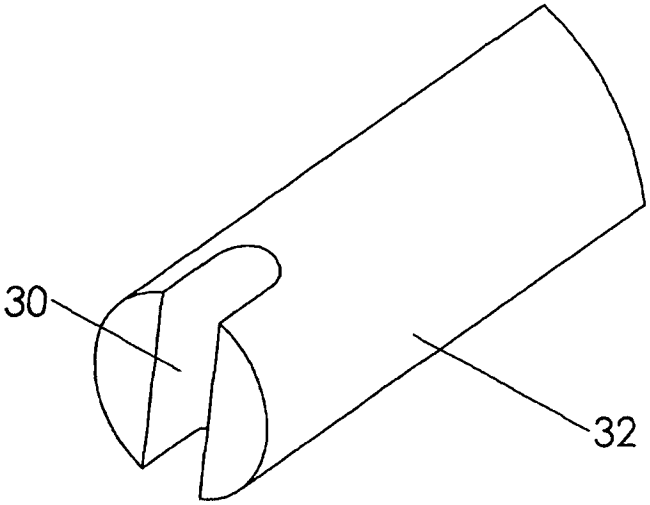
FIG. 31 is a detail perspective view of the proximal end of the piston rod of the external-barrel embodiment of the present invention.

FIG. 26 is a section view of the barrel assembly shown in FIG. 24 taken at the section line shown in. FIG. 24 with the barrel in a pre-fire position. In this embodiment, gas enters the gas chamber 30 (see FIG. 27) via the gas port 31, thereby pushing the piston rod 32 forward and the gas cylinder 27 rearward (see FIG. 31 for a view of the proximal end of the piston rod 32, which forms the gas chamber 30). Because the gas cylinder 27 is affixed to the barrel 4, the barrel 4 also moves rearward.

Figure 27:
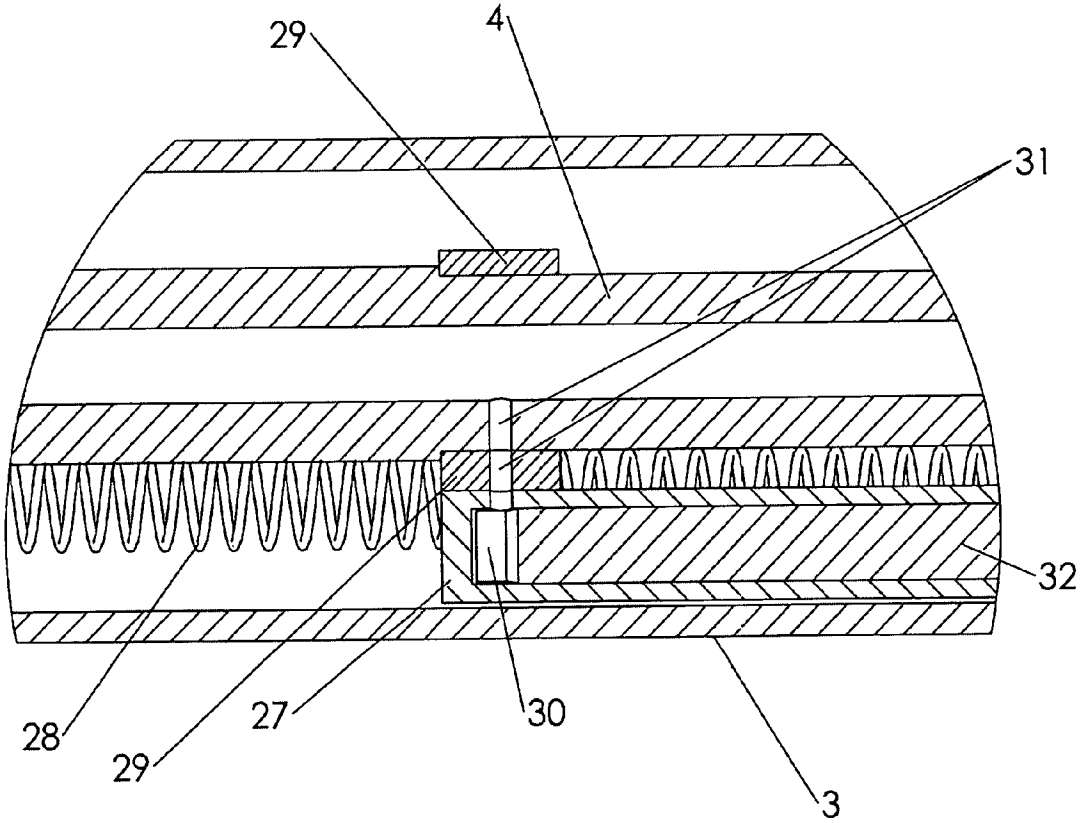
FIG. 27 is a detail view of the gas port section of the barrel assembly cross-section view shown in FIG. 26.

FIG. 27 is a detail view of the gas port section of the barrel assembly cross-section view shown in FIG. 26. In a preferred embodiment, a threaded gas regulator insert (not shown) would be threaded into the left (from the perspective of this figure) end of the external gas cylinder 27 between the two compression springs 28.

Figure 28:
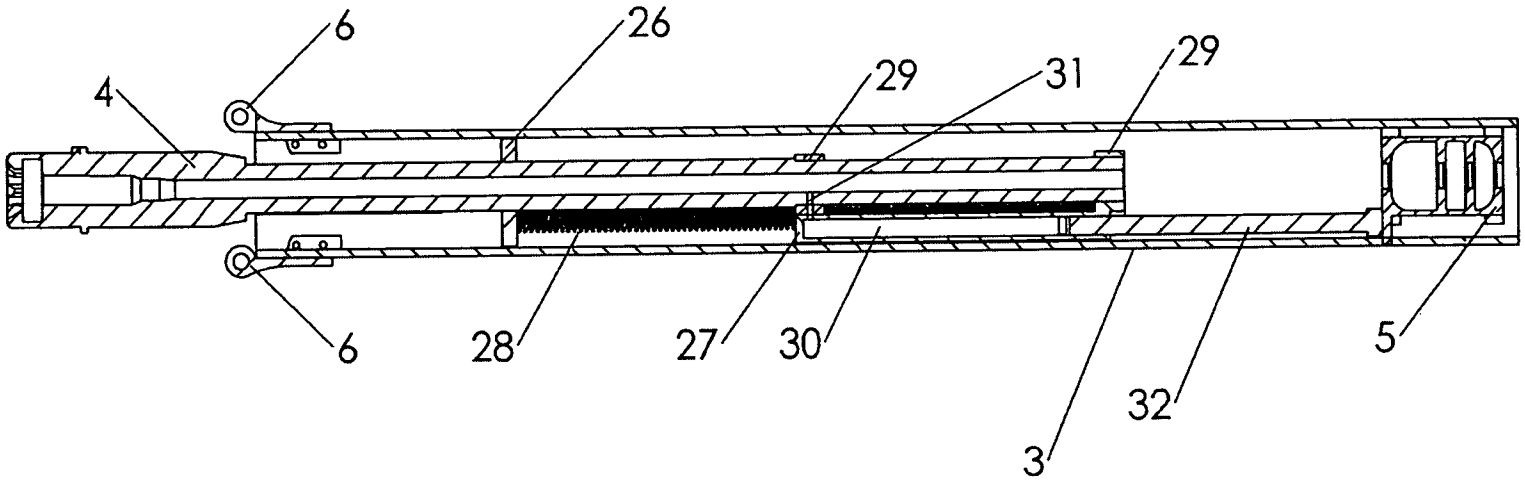
FIG. 28 is a section view of the barrel assembly shown in FIG. 24 taken at the section line shown in FIG. 24 but with the barrel in a mid-fire position.
Figure 29:
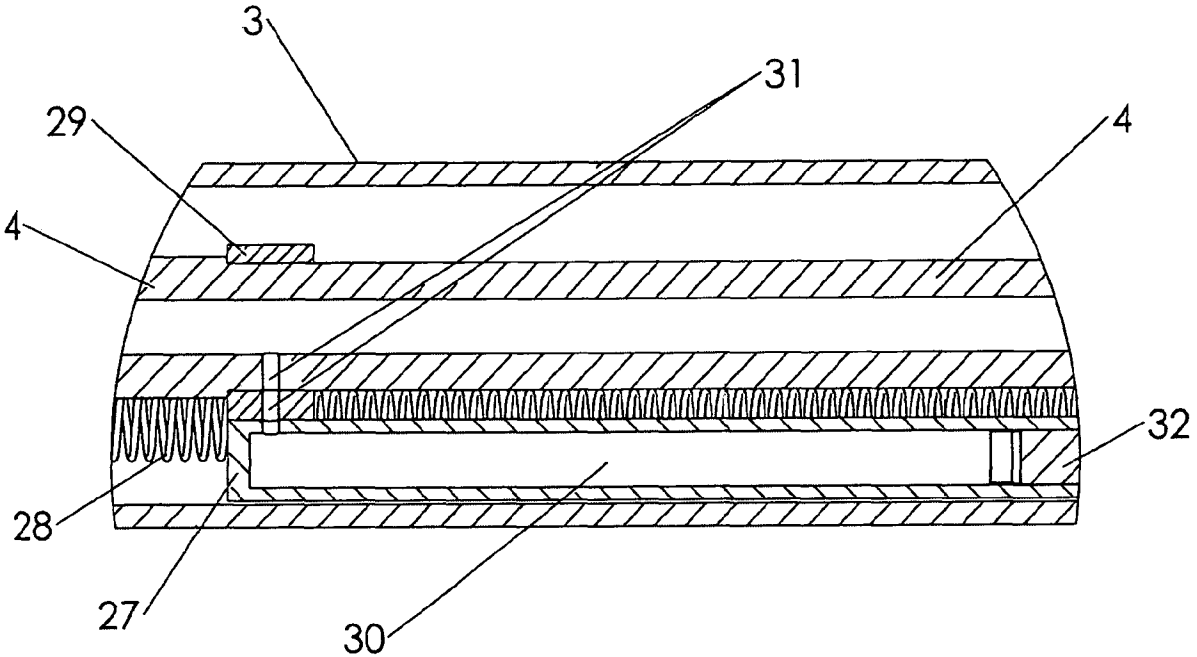
FIG. 29 is a detail view of the gas port section of the barrel assembly cross-section view shown in FIG. 28.

FIG. 28 is a section view of the barrel assembly shown in FIG. 24 taken at the section line shown in FIG. 24 but with the barrel in a mid-fire position. As shown in this figure, the volume of the gas chamber 30 increases until the compression springs 28 reach their maximum compression point. FIG. 29 is a detail view of the gas port section of the barrel assembly cross-section view shown in FIG. 28.

In those embodiments that incorporate a compression spring (that is, the long-barrel, medium-barrel and external-barrel embodiments), the compressed spring must be long enough to provide consistent spring resistance during the entire cycle process. A safe estimate is that the uncompressed spring is twice the cycle length so that the fully compressed spring would typically be the same as a cycle length. Although the length of each component ultimately affects the overall minimum barrel length, the most critical factors are the cycle length and the compressed spring length. The cycle length is based primarily on the cartridge length. The compressed spring length can be shortened through the use of wave springs or flat compression springs.

All of the embodiments discussed above incorporate a receiver brake 5 that is attached to the shroud 3. By contrast, muzzle brakes, as are used in connection with conventional firearms, are attached to the barrel. The receiver brake of the present invention is configured as shown in the figures; that is, it is generally rectangular in shape with one or more interior baffles extending laterally across the width of the receiver brake, each of the baffles having a central bore for passage of the projectile after it exits the distal end of the barrel. The receiver brake is situated inside of the shroud on the distal (or muzzle) end of the firearm, as shown.

The purpose of the receiver brake is to pull the receiver forward at the time of firing, thereby counteracting felt recoil to the shooter. When the barrel is in battery and fully forward, it is in contact, but not fixed to, the receiver brake. As the gas emitted by the detonation of the cartridge hits the receiver brake, that gas provides a forward force against the baffles on the inside of the receiver brake. During firing, the exiting gases act on the receiver brake in a similar manner to the action of gases on a muzzle brake, except that rather than counteracting the recoil forces acting on the barrel, the receiver brake acts only on the receiver, pulling it forward as rearward pressure begins to be applied by the recoiling barrel. The forward movement of the shroud caused by the receiver brake serves to further compress the spring (in the case of those embodiments that incorporate the compression spring) or extend the spring (in the case of the short-barrel embodiment).

In alternate embodiments, a muzzle brake may be used in addition to the receiver brake of the present invention; however, the muzzle brake serves to reduce the barrel's recoil energy. The present invention does not aim to reduce any of the barrel's recoil energy but rather to redirect it toward the operation of the firearm. At the same time, the receiver brake reduces the felt recoil to the shooter.

In preferred embodiments, the minimum barrel length is calculated as follows:

For the long-barrel embodiment: chamber+rear bushing+compressed spring+cycle length+gas regulator+barrel bushing+cycle length.

For the medium-barrel embodiment: chamber+rear bushing+compressed spring+cycle length+gas tube flange+extended barrel bushing flange.

For the short-barrel embodiment:

Chamber+gas tube flange+cycle length+parts overlap (0.5 inches at full extension).

For the external-barrel embodiment:

Chamber+rear bushing+compressed spring+cycle length+spring housing wall (muzzle end of barrel). As used herein, the term "spring housing wall" refers to that part of the forward collar 29 that lies between the distal end of the compression spring 28 and the receiver brake 5 (see FIG. 30).

Referring to the various embodiments described above, the long-barrel embodiment has the advantage of simplicity; however, it requires a long barrel and does not allow for gas regulator changes without disassembly. The medium-barrel embodiment can be used with a shorter barrel, but a disadvantage of this embodiment is that there is an additional sleeve layer around the barrel (the extended barrel bushing tube), which may add to the overall weight of the firearm. A significant advantage of the medium-barrel embodiment is that it allows for adjustment of the gas regulator without disassembly of the firearm. The short-barrel embodiment can be used with a rifle-caliber pistol, and the gas regulator can be adjusted by the operator without disassembly; however, the extremely short barrel length will greatly reduce the overall weight of the firearm, which may cause additional felt recoil. Finally, the external-barrel embodiment provides advantages in terms of manufacturing and ease of cleaning. Parts external to the barrel may generate additional lifting or lowering forces during firing, which could have a cumulative effect and pull the barrel off target during automatic fire. For this reason, dual springs and dual pistons on opposites sides of the barrel (as shown and described herein) are preferred to counter these forces.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A firearm comprising a barrel assembly, a forward receiver, and a receiver brake;

wherein the barrel assembly is located inside of the forward receiver;

wherein the barrel assembly comprises a barrel, a compression spring, a gas tube, a front bushing, and a rear bushing;

wherein the gas tube is situated around the barrel between the front and rear bushings and is not attached to the barrel;

wherein the compression spring is situated around the barrel between the front and rear bushings and inside of the gas tube;

wherein both the front and rear bushings are fixedly attached to the forward receiver;

wherein the barrel comprises a gas port;

wherein the gas port is covered by a gas regulator and is in fluid communication with a gas chamber;

wherein the gas chamber is situated between the front bushing and the gas regulator;

wherein the gas regulator is fixedly attached to the barrel;

wherein the barrel has a circumference, and the gas regulator extends around the entire circumference of the barrel and is surrounded by the gas tube;

wherein the gas tube terminates in the front bushing; and wherein the receiver brake is fixedly attached to the forward receiver on a distal end of the forward receiver, the receiver brake comprising one or more interior baffles extending laterally across a width of the receiver brake, each of the baffles having a central bore that is configured to allow passage of a projectile through the central bore after the projectile exits a distal end of the barrel.

2. The firearm of claim 1, wherein the front bushing is configured to create an air-tight seal around the barrel, thereby allowing the barrel to move rearward without loss of pressurization in the gas chamber during firearm cycling.

3. The firearm of claim 1, wherein the gas port is situated at a rearward end of the gas chamber; and wherein the gas regulator is configured to form a ceiling and a rear wall of the gas chamber.

4. A firearm comprising a barrel assembly, a forward receiver, and a receiver brake;

wherein the barrel assembly is located inside of the forward receiver;

wherein the barrel assembly comprises a barrel, a rear bushing that is affixed to the forward receiver, a compression spring, a combined gas regulator and gas tube, and an extended barrel bushing tube with a forward flange;

wherein the receiver brake abuts up against a distal surface of the forward flange of the extended barrel bushing tube;

wherein the compression spring surrounds the barrel and is situated around the outside of the combined gas regulator and gas tube;

wherein a distal end of the compression spring abuts up against a forward flange of the combined gas regulator and gas tube;

wherein the combined gas regulator and gas tube extends from the forward flange of the combined gas regulator and gas tube to a center of the barrel;

wherein a proximal end of the combined gas regulator and gas tube covers a gas port that is configured to provide a fluid communication between a bore in the barrel and a gas chamber;

wherein the forward flange of the combined gas regulator and gas tube is situated against the forward flange of the extended barrel bushing tube;

wherein the forward flange of the extended barrel bushing tube is affixed to the forward receiver at a muzzle end of the barrel;

wherein the barrel is fixedly attached to the combined gas regulator and gas tube at a proximal end of the combined gas regulator and gas tube; and wherein the receiver brake is fixedly attached to the forward receiver on a distal end of the forward receiver, the receiver brake comprising one or more interior baffles extending laterally across a width of the receiver brake, each of the baffles having a central bore that is configured to allow passage of a projectile through the central bore after the projectile exits a distal end of the barrel.

5. The firearm of claim 4, wherein the forward flange of the combined gas regulator and gas tube is configured to act as a gas regulator knob by adjusting a volume of gas emitted into the gas chamber via the gas port when the combined gas regulator and gas tube is rotated.

6. The firearm of claim 4, wherein the barrel forms a rear wall of the gas chamber and a proximal end of the extended barrel bushing tube forms a front wall of the gas chamber; and wherein the combined gas regulator and gas tube forms a ceiling of the gas chamber.

7. The firearm of claim 4, wherein at maximum spring compression, the gas port is situated forward of the rear bushing.

8. The firearm of claim 4, wherein the gas port is situated at a rear-most end of the gas chamber.

9. A firearm comprising a barrel assembly, a forward receiver, and a receiver brake;

wherein the barrel assembly is located inside of the forward receiver;

wherein the barrel assembly comprises a barrel, an extension spring, a combined gas regulator and gas tube, and an extended barrel bushing tube;

wherein the extended barrel bushing tube is affixed to the forward receiver;

wherein the extension spring lies between a rear flange of the combined gas regulator and gas tube and a forward flange of the extended barrel bushing tube;

wherein the receiver brake abuts up against a distal surface of the forward flange of the extended barrel bushing tube;

wherein a proximal end of the extension spring abuts up against and is affixed to the rear flange of the combined gas regulator and gas tube;

wherein a distal end of the extension spring abuts up against and is affixed to the forward flange of the extended barrel bushing tube;

wherein the rear flange of the combined gas regulator and gas tube is fixedly attached to the barrel;

wherein the forward flange of the extended barrel bushing tube is affixed to the forward receiver; and wherein the receiver brake is fixedly attached to the forward receiver on a distal end of the forward receiver, the receiver brake comprising one or more interior baffles extending laterally across a width of the receiver brake, each of the baffles having a central bore that is configured to allow passage of a projectile through the central bore after the projectile exits a distal end of the barrel.

10. The firearm of claim 9, wherein the combined gas regulator and gas tube comprises a gas tube portion and a gas regulator portion; and wherein the gas tube portion extends forward of the gas regulator portion.

11. The firearm of claim 9, wherein the combined gas regulator and gas tube forms a ceiling of the gas chamber;

wherein the barrel forms a rear wall of the gas chamber; and wherein a proximal end of the extended barrel bushing tube forms a front wall of the gas chamber.

12. The firearm of claim 9, wherein at maximum spring extension, the gas port is situated forward of the rear flange of the combined gas regulator and gas tube.

13. The firearm of claim 9, wherein at maximum spring extension, the combined gas regulator and gas tube and the extended barrel bushing tube are configured to overlap, thereby preventing the gas chamber from losing pressurization.

14. A firearm comprising a barrel assembly, a forward receiver, and a receiver brake;

wherein the barrel assembly is located inside of the forward receiver;

wherein the barrel assembly comprises two compression springs, a rear bushing, an external gas cylinder, and a piston rod;

wherein the rear bushing is affixed to the forward receiver;

wherein the external gas cylinder is secured to the barrel;

wherein the two compression springs are situated external to the barrel without encircling it;

wherein a proximal end of each of the two compression springs abuts up against the rear bushing;

wherein a proximal end of the piston rod forms a gas chamber;

wherein the barrel comprises a gas port that is in fluid communication with the gas chamber; and wherein the receiver brake is fixedly attached to the forward receiver on a distal end of the forward receiver, the receiver brake comprising one or more interior baffles extending laterally across a width of the receiver brake, each of the baffles having a central bore that is configured to allow passage of a projectile through the central bore after the projectile exits a distal end of the barrel.

15. The firearm of claim 14, wherein the external gas cylinder is affixed to the barrel with two collars that encircle the barrel and are affixed to the gas cylinder; and wherein a distal end of each of the two compression springs terminates in a recess in the forward collar.

16. The firearm of claim 15, wherein the rear-most of the two collars is configured to regulate the volume of gas entering the gas chamber via the gas port.

*17. A firearm comprising a barrel assembly and a forward receiver;*

*wherein the barrel assembly is located inside of the forward receiver;*

*wherein the barrel assembly comprises a barrel, a compression spring, a gas tube, a front bushing, and a rear bushing;*

*wherein the gas tube is situated around the barrel between the front and rear bushings and is not attached to the barrel;*

*wherein the compression spring is situated around the barrel between the front and rear bushings and inside of the gas tube;*

*wherein both the front and rear bushings are fixedly attached to the forward receiver;*

*wherein the barrel comprises a gas port;*

*wherein the gas port is covered by a gas regulator and is in fluid communication with a gas chamber;*

*wherein the gas chamber is situated between the front bushing and the gas regulator;*

*wherein the gas regulator is fixedly attached to the barrel;*

*wherein the barrel has a circumference, and the gas regulator extends around the entire circumference of the barrel and is surrounded by the gas tube; and*

*wherein the gas tube terminates in the front bushing.*

*18. The firearm of claim 17, wherein the front bushing is configured to create an air-tight seal around the barrel, thereby allowing the barrel to move rearward without loss of pressurization in the gas chamber during firearm cycling.*

*19. The firearm of claim 17, wherein the gas port is situated at a rearward end of the gas chamber; and*

*wherein the gas regulator is configured to form a ceiling and a rear wall of the gas chamber.*

*20. A firearm comprising a barrel assembly and a forward receiver;*

*wherein the barrel assembly is located inside of the forward receiver;*

*wherein the barrel assembly comprises a barrel, a rear bushing that is affixed to the forward receiver, a compression spring, a combined gas regulator and gas tube, and an extended barrel bushing tube with a forward flange;*

*wherein the compression spring surrounds the barrel and is situated around the outside of the combined gas regulator and gas tube;*

*wherein a distal end of the compression spring abuts up against a forward flange of the combined gas regulator and gas tube;*

*wherein the combined gas regulator and gas tube extends from the forward flange of the combined gas regulator and gas tube to a center of the barrel;*

*wherein a proximal end of the combined gas regulator and gas tube covers a gas port that is configured to provide a fluid communication between a bore in the barrel and a gas chamber;*

*wherein the forward flange of the combined gas regulator and gas tube is situated against the forward flange of the extended barrel bushing tube;*

*wherein the forward flange of the extended barrel bushing tube is affixed to the forward receiver at a muzzle end of the barrel; and*

*wherein the barrel is fixedly attached to the combined gas regulator and gas tube at a proximal end of the combined gas regulator and gas tube.*

*21. The firearm of claim 20, wherein the forward flange of the combined gas regulator and gas tube is configured to act as a gas regulator knob by adjusting a volume of gas emitted into the gas chamber via the gas port when the combined gas regulator and gas tube is rotated.*

*22. The firearm of claim 20, wherein the barrel forms a rear wall of the gas chamber and a proximal end of the extended barrel bushing tube forms a front wall of the gas chamber; and*

*wherein the combined gas regulator and gas tube forms a ceiling of the gas chamber.*

*23. The firearm of claim 20, wherein at maximum spring compression, the gas port is situated forward of the rear bushing.*

*24. The firearm of claim 20, wherein the gas port is situated at a rear-most end of the gas chamber.*

*25. A firearm comprising a barrel assembly and a forward receiver;*

*wherein the barrel assembly is located inside of the forward receiver;*

*wherein the barrel assembly comprises a barrel, an extension spring, a combined gas regulator and gas tube, and an extended barrel bushing tube;*

*wherein the extended barrel bushing tube is affixed to the forward receiver;*

*wherein the extension spring lies between a rear flange of the combined gas regulator and gas tube and a forward flange of the extended barrel bushing tube;*

*wherein a proximal end of the extension spring abuts up against and is affixed to the rear flange of the combined gas regulator and gas tube;*

*wherein a distal end of the extension spring abuts up against and is affixed to the forward flange of the extended barrel bushing tube;*

*wherein the rear flange of the combined gas regulator and gas tube is fixedly attached to the barrel; and*

*wherein the forward flange of the extended barrel bushing tube is affixed to the forward receiver.*

*26. The firearm of claim 25, wherein the combined gas regulator and gas tube comprises a gas tube portion and a gas regulator portion; and*

*wherein the gas tube portion extends forward of the gas regulator portion.*

*27. The firearm of claim 25, wherein the combined gas regulator and gas tube forms a ceiling of the gas chamber;*

*wherein the barrel forms a rear wall of the gas chamber; and*

*wherein a proximal end of the extended barrel bushing tube forms a front wall of the gas chamber.*

*28. The firearm of claim 25, wherein at maximum spring extension, the gas port is situated forward of the rear flange of the combined gas regulator and gas tube.*

*29. The firearm of claim 25, wherein at maximum spring extension, the combined gas regulator and gas tube and the extended barrel bushing tube are configured to overlap, thereby preventing the gas chamber from losing pressurization.*

*30. A firearm comprising a barrel assembly and a forward receiver;*

*wherein the barrel assembly is located inside of the forward receiver;*

*wherein the barrel assembly comprises two compression springs, a rear bushing, an external gas cylinder, and a piston rod;*

*wherein the rear bushing is affixed to the forward receiver;*

*wherein the external gas cylinder is secured to the barrel;*

*wherein the two compression springs are situated external to the barrel without encircling it;*

*wherein a proximal end of each of the two compression springs abuts up against the rear bushing;*

*wherein a proximal end of the piston rod forms a gas chamber; and*

*wherein the barrel comprises a gas port that is in fluid communication with the gas chamber.*

*31. The firearm of claim 30, wherein the external gas cylinder is affixed to the barrel with two collars that encircle the barrel and are affixed to the gas cylinder; and*

*wherein a distal end of each of the two compression springs terminates in a recess in the forward collar.*

*32. The firearm of claim 31, wherein the rear-most of the two collars is configured to regulate the volume of gas entering the gas chamber via the gas port.*

* * * * *